US012779906B2

(12) United States Patent
Giannini et al.

(10) Patent No.: US 12,779,906 B2
(45) Date of Patent: Nov. 3, 2026

(54) COMPOSITIONS FOR ELASTOMERIC COMPOUNDS AND TYRES FOR VEHICLES COMPRISING REVERSIBLE CROSS-LINKING AGENT

(71) Applicant: Pirelli Tyre S.p.A., Milan (IT)

(72) Inventors: Luca Giannini, Milan (IT); Luciano Tadiello, Milan (IT); Silvia Guerra, Milan (IT); Thomas Hanel, Milan (IT); Christoph Weder, Duedingen (CH); Stephen Schrettl, Le Mont Pélerin (CH)

(73) Assignee: PIRELLI TYRE S.p.A., Milan (IT)

( * ) Notice: Subject to any disclaimer, the term of this patent is extended or adjusted under 35 U.S.C. 154(b) by 639 days.

(21) Appl. No.: 18/257,739

(22) PCT Filed: Dec. 21, 2021

(86) PCT No.: PCT/IB2021/062064
§ 371 (c)(1),
(2) Date: Jun. 15, 2023

(87) PCT Pub. No.: WO2022/137099
PCT Pub. Date: Jun. 30, 2022

(65) Prior Publication Data

US 2024/0059100 A1 Feb. 22, 2024

(30) Foreign Application Priority Data

Dec. 22, 2020 (IT) ........................ 102020000031946

(51) Int. Cl.
*B60C 1/00* (2006.01)
*C08K 3/30* (2006.01)
(Continued)

(52) U.S. Cl.
CPC .......... *B60C 1/0016* (2013.01); *B60C 1/0025* (2013.01); *C08K 3/30* (2013.01);
(Continued)

(58) Field of Classification Search
CPC .................................................... B60C 1/0016
See application file for complete search history.

(56) References Cited

U.S. PATENT DOCUMENTS 4,742,124 A 5/1988 Tsutsumi et al.
7,847,019 B2 * 12/2010 David .................. C07D 213/59
525/54.1

(Continued)

FOREIGN PATENT DOCUMENTS

EP 0 451 604 A2 10/1991
EP 2 283 046 A1 2/2011

(Continued)

OTHER PUBLICATIONS

International Search Report form the European Patent Office in corresponding International Application No. PCT/IB2021/062064 mailed Mar. 14, 2022.

(Continued)

*Primary Examiner* — Michael F Pepitone
(74) *Attorney, Agent, or Firm* — Finnegan, Henderson, Farabow, Garrett & Dunner, L.L.P.

(57) ABSTRACT

The present invention relates to compositions for elastomeric compounds for tyres, in particular for tyre treads, comprising particular reversible cross-linking agents, tyre components and tyres for vehicle wheels which comprise them. The present elastomeric compounds, due to their particular hysteretic behaviour, allow manufacturing tyres characterised by a lower rolling resistance during moderate driving and at the same time greater resistance to tearing and road grip during sports driving.

26 Claims, 9 Drawing Sheets

(51) Int. Cl.
*C08K 5/00* (2006.01)
*C08L 9/00* (2006.01)

(52) U.S. Cl.
CPC .............. *C08K 5/0025* (2013.01); *C08L 9/00* (2013.01); *C08K 2003/309* (2013.01)

(56) References Cited

U.S. PATENT DOCUMENTS

| | | | |
|---|---|---|---|
| 2007/0062625 A1 | 3/2007 | Koster et al. | |
| 2013/0160911 A1 | 6/2013 | Mruk et al. | |
| 2013/0165596 A1 | 6/2013 | Mruk et al. | |
| 2014/0148555 A1* | 5/2014 | Mruk | C08F 8/42 525/332.9 |
| 2014/0371341 A1* | 12/2014 | Moszner | C08F 122/22 526/240 |
| 2016/0083494 A1 | 3/2016 | Mruk et al. | |

FOREIGN PATENT DOCUMENTS

| | | |
|---|---|---|
| EP | 2 408 626 B1 | 5/2013 |
| EP | 2 607 381 A1 | 6/2013 |
| EP | 2 271 682 B1 | 4/2016 |
| EP | 2 895 515 B1 | 8/2017 |
| EP | 3 049 447 B1 | 6/2018 |
| IT | 201900025804 A1 | 6/2021 |
| WO | WO 03053721 A1 | 7/2003 |
| WO | WO 2015/086039 A1 | 6/2015 |
| WO | WO 2016/050887 A1 | 4/2016 |
| WO | WO 2016/174628 A1 | 11/2016 |
| WO | WO 2016/174629 A1 | 11/2016 |
| WO | WO 2017/211876 A1 | 12/2017 |
| WO | WO 2018/078480 A1 | 5/2018 |
| WO | WO 2018/087685 A1 | 5/2018 |
| WO | WO 2020/225595 A1 | 11/2020 |

OTHER PUBLICATIONS

Written Opinion of the International Searching Authority from the European Patent Office in corresponding International Application No. PCT/IB2021/062064 mailed Mar. 14, 2022.

* cited by examiner

2a)

TGA

2b)

DSC

3i)

3l)

4a)
E' (MPa)
Tan Delta
Temp (°C)
4b)
E' (MPa)
Tan Delta
Temp (°C)
4c)
E' (MPa)
Tan Delta
Temp (°C)

6a)

6b)

COMPOSITIONS FOR ELASTOMERIC COMPOUNDS AND TYRES FOR VEHICLES COMPRISING REVERSIBLE CROSS-LINKING AGENT

This application is a national stage entry application under 35 U.S.C. § 371 of International Application No. PCT/IB2021/062064, filed on Dec. 21, 2021, and claims priority to Italian Application No. 102020000031946, filed Dec. 22, 2020; the contents of each application is incorporated herein by reference in its entirety.

The present invention relates to compositions for elastomeric compounds for tyres, in particular for tyre treads, comprising particular reversible cross-linking agents, tyre components and tyres for vehicle wheels which comprise them.

PRIOR ART

When driving motor vehicles on the road, quieter driving phases typically alternate, with limited manoeuvres at low or constant speeds, with more lively driving phases, at high speeds, with sudden accelerations, decelerations and sudden changes of direction.

In moderate driving, where there are no particular problems of road grip, it becomes particularly important to minimise fuel consumption and wear of the tread to ensure a long distance. Therefore, for this application, treads with little dissipative elastomeric compounds with low rolling resistance, which however are not particularly performing in terms of road grip and tear resistance, would be preferable.

Conversely, in the case of sports driving, the tread compound should be highly dissipative to provide maximum road grip, albeit at the expense of fuel consumption and wear.

For mixed driving, which may typically occur on the road, the elastomeric compound of the tread should therefore ideally have a contained hysteresis at temperatures below the order of 50° C.-70° C. typical of moderate driving, to ensure lower consumption and tyre life, and a hysteresis at least equal to or preferably increased at higher temperatures, in the range around 90° C.-180° C., of sportier driving, to provide the desired road grip and tear resistance.

At the level of the elastomeric material of the tread it is very difficult to reconcile these opposing needs and, in practice, one is satisfied with the best possible compromise, i.e. compounds that provide road grip, rolling resistance and resistance to tearing/wear which are acceptable, even if not ideal.

Conventional elastomeric compounds, such as the reference compound 1 described in the present experimental part, do not show that ideal hysteresis pattern.

Rather, as shown in FIG. 4*a*, it is observed that the Tan delta value is high at lower temperatures while it significantly decreases with increasing temperature (monotone decreasing Tan delta pattern).

It is possible to modify the hysteretic behaviour of an elastomeric compound by adding poorly miscible components, for example by adding poorly compatible polymers to the elastomers, as shown for example in WO03053721A1 in Example 5, where the introduction of a cyclo-olefin strongly increases both the hot hysteresis (about 50%) than cold stiffness (about 100%), or resins in a certain amount, as described for example in Mildenberg et al. Hydrocarbon resins (Wiley 1997), p. 141 chap. 5.5, *"Rubber Tyres and mechanical rubber goods"*.

In these multiphase mixtures, a retention or an increase of the hysteresis may be observed as the temperature increases.

However, these elastomeric compounds generally exhibit problems in the mechanical properties caused precisely by the immiscibility and inhomogeneity of the components. Among these, for example, a poor resistance to tearing and often a strong dependence of the dynamic modulus on temperature are observed: since the increase in hysteresis at higher temperatures is usually linked to a transition of the phase dispersed in the compound, this transition also corresponds to a strong variation of the phase modulus and consequently of the compound. A strong dependence of the dynamic modulus on temperature is critical for the tyre as cold hardening affects the tread pattern and therefore the possibility of developing significant friction, greatly reducing grip under normal driving conditions, especially at lower temperatures and on wet roads, while an excessively low modulus in hot conditions may result in poor driving precision.

Studies aimed at modifying the mechanical properties of elastomeric materials by forming coordination bonds with metal ions are known from literature.

For example EP2607381A1, in the name of Goodyear, describes functionalised elastomeric polymers, comprising multidentate ligands capable of complexing metal ions. According to the document (par. 32, p. 7) the interaction of the metal ion with the functionalised elastomer in the compound should result in an increase in the modulus, in an improved interaction with the reinforcing fillers or in a greater adhesion of the rubber to the reinforcing elements.

However, the document does not provide any indication on the dynamic properties, in particular about the hysteresis pattern, of the compounds described therein, nor does it discuss the aforementioned balancing problems between road grip, rolling resistance and tyre wear.

In the experimental part, the only metals actually tested are iron and ruthenium, added to the compound in the form of $FeSO_4$ and $RuCl_3$, in large amounts (Example 5 at 5% and Example 6, even at 67%).

The article Macromolecules (2016), 49, 1781-1789 describes styrene-butadiene-vinylpyridine elastomers—in which vinylpyridine is present as a functionalisation of the polymer itself—which, through coordination of metal ions, would form a reversible cross-linked structure, with improved modulus, tensile strength and hardness. The salts studied in this article are Zn, Ni, Co, La and Fe chlorides, used in amounts in the order of 5-13%. These salts are all characterised by the chloride anion, a strong ligand that competes with the pyridine ligand in the formation of the complex with the metal, penalising the desired complexation reaction and presumably leading to the formation of several different complexes and/or a separate phase comprising the salt itself and pyridine ligands. The separate phase would lead to a strong stiffening of the elastomeric formulation, while alternative coordination situations would determine an increase in dissipation in a wide and uncontrolled temperature range.

In this regard, from the curves shown in this article in FIG. 5, it is possible to observe significant changes in the dynamic properties as the metal content of those compounds increases. In particular, FIG. 5*b* shows that as the zinc salt content increases, there is an increase in the peak of the transition at +50° C. and at the same time a decrease of that −15° C. relative to the transition of the polybutadiene component. The attenuation of the peak at −15° C. suggests that the elastomeric nature of the material tends to be lost with the addition of the zinc salt, predictive of a worsening of grip in the tyre. Furthermore, the increase for the transition at about +50° C. is not advantageous in the balance between rolling resistance and sports driving discussed above, as it would worsen the rolling resistance.

The changes in properties are even more evident in FIG. 5*a*: as the zinc salt content increases, the elastic modulus E' at room temperature increases by at least one order of magnitude, from values below 5 MPa, typical of a rubber, to almost 100 MPa, closer to that of a plastic. The "plateau" of the module E' is no longer recognisable for the "rubbery" materials with more than 0.3 moles of zinc salt compared to the moles of bound pyridine. This significant increase in the modulus at lower temperatures and around the ambient temperature makes the material unsuitable for use in the tyre, as it does not have the correct deformability and footprint, therefore predicting a worsening of the road grip of the tyre in normal driving conditions.

Patent application US2007/0062625A1 in the name of Goodyear discusses in general terms the problem of the compromise between traction, rolling resistance and wear of the tread (par. 003) and proposes as a possible solution the incorporation in the elastomeric compound of porous crystalline metallo-organic polymeric compounds (metal organic frameworks or MOFs) consisting of divalent zinc and a multidentate organic polymeric ligand. The preferred and exemplified organic ligands are polycarboxylic organic acids.

Regarding the hysteresis of these materials, the document only suggests the use of S—SBR in the tread to reduce rolling resistance (par. 34) but does not provide any clue as to the possibility of increasing dissipation and Tan delta under the aforementioned sports driving conditions.

In conclusion, the methods based on the complexation of metals shown in the literature do not teach how to impart a hysteresis to the tyre compounds in the terms and in the temperature ranges useful for imparting the desired properties discussed above. Furthermore, they are particularly complex especially in the preparation of the functionalised elastomer, by polymerisation of at least three different monomers (butadiene, styrene and ligand), with critical distribution, tacticity and stereoselectivity of insertion and obtainable molecular weight.

The very presence of the ligands is problematic both in the synthesis of the functionalised polymer, due to the potential impact on the living anionic polymerisation process in solution, and subsequently due to the interference in the vulcanisation, requiring a new development of the respective elastomeric compositions.

Moreover, to allow flexibility of use for the entire range of application of the commonly used SBRs and therefore a broad industrial applicability, it would be necessary to create multiple ad hoc functionalised polymers.

Finally, the methods of literature, probably due to non-optimal complexation reactions, generally employ very large amounts of metal salt with inevitable problems of dispersion and possible formation of separate phases in the compound, which results in an excessive reinforcement and hardening, up to the point of losing the elastomeric features thereof.

There remains therefore the need to provide an elastomeric compound for tyre treads which allows a high road grip in sports driving conditions together with a reduced rolling resistance and low wear in moderate driving conditions. Furthermore, it is desirable that the preparation of the compound be simple, without the need for complex functionalisation of the elastomer, of easy industrial applicability and versatile.

SUMMARY OF THE INVENTION

The Applicant has surprisingly found that it is possible to modify ad hoc the hysteretic properties of an elastomeric compound for conventional tyres, in order to produce tyres characterised by a lower rolling resistance, better resistance to tearing and at the same time by a better road grip in sports driving, by virtue of the addition of cross-linking agents and particular metal salts.

By virtue of the anchoring reaction of these cross-linking agents to the elastomers, a reaction which advantageously takes place during the normal tyre production process, in particular in the vulcanisation step, on the one hand, and of the efficient reversible complexation of the metal ions by the ligands present in said agents, on the other hand, an additional cross-linking is obtained which consolidates the compound in conditions of relatively low temperature, typical of moderate driving, while imparting it greater hysteresis and resistance to tearing precisely at the most demanding conditions and at the highest temperatures of sports driving, where the complexation of the metal ions becomes labile, presumably triggering a dynamic dissipative mechanism linked to the breaking under stress and to the rapid reformation of the coordinative bonds.

On the other hand, at the lower temperatures typical of moderate driving, the coordinative bonds are stable and the compound therefore exhibits a normal hysteresis, resulting in lower rolling resistance and tyre wear in the tyre, with undoubted environmental advantages as well.

Advantageously, the present invention avoids, as instead taught in the literature, having to modify the elastomeric polymer in advance by functionalising it with the desired ligand, thus avoiding the complications mentioned above and allowing considerable versatility.

Surprisingly, the Applicant has found that the present cross-linking agents not only bind well to the elastomers in the compound, in its normal production conditions and despite the presence of numerous other additives, but also that they are then able to complex and decompose the metal ions rapidly and effectively, as a function of the temperature reached by the system and the stresses, as schematised for a preferred embodiment in the following Scheme 1:

Scheme 1

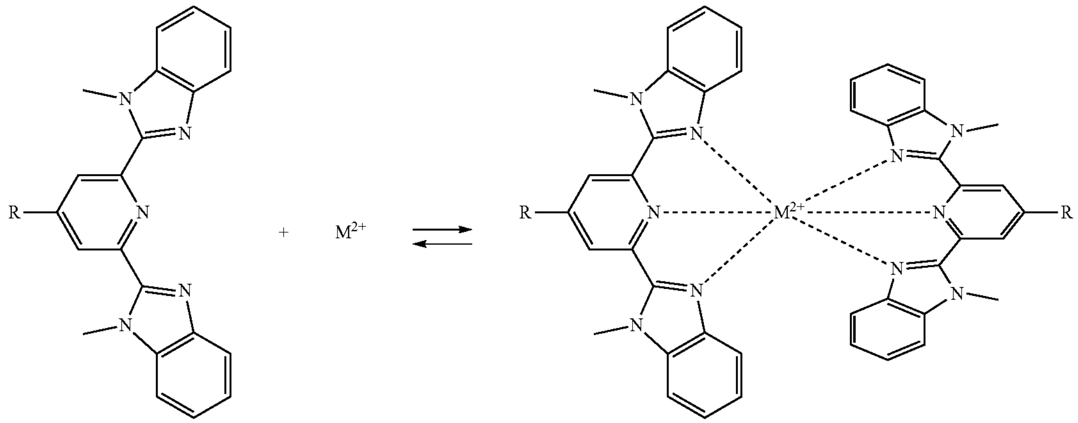

wherein R generically represents the elastomer.

Advantageously, in the present invention, the salt of the metal ion may be used in decidedly lower amounts (around 1-3% by weight) with respect to the known processes described above.

Therefore, a first aspect of the present invention is an elastomeric composition for tyre compounds comprising at least:

100 phr of at least one diene elastomeric polymer, at least 0.1 phr of at least one reversible cross-linking agent of formula (I)

A-B-C (I)

wherein

A is at least one functional group capable of covalently binding to the elastomeric polymer, B, optionally present, is an at least divalent inert organic residue covalently bonded to A and C groups, having a molecular weight preferably of less than 4000 g/mol, C is at least one multidentate organic ligand capable of reversibly complexing at least one metal cation, at least 0.1 phr of at least one salt of the metal cation, at least 0.1 phr of at least one reinforcing filler, and at least 0.1 phr of the at least one vulcanising agent.

A further aspect of the present invention is represented by a vulcanised elastomeric compound for tyres obtained by mixing and vulcanising the elastomeric composition according to the invention.

A further aspect of the present invention is represented by a process for preparing the vulcanised elastomeric compound according to the invention, comprising a first non-productive step and a second productive step, comprising in the first non-productive step, mixing at least one dienic elastomeric polymer, at least one reinforcing filler, and optionally, in whole or in part, at least one reversible cross-linking agent of formula (I) and at least one salt of the metal cation as defined above, at a temperature preferably between 100 and 200° C., to give a first elastomeric compound, in the second productive step, adding to the first elastomeric compound at least one vulcanising agent and possibly, in whole or in part, at least one reversible cross-linking agent of formula (I) and at least one salt of the metal cation as defined above, and mixing the components at a temperature preferably below 120° C., to give a vulcanisable elastomeric compound, provided that said at least one reversible cross-linking agent of formula (I) and at least one salt of the metal cation are added in at least one of the two non-productive or productive steps, and vulcanising the vulcanisable elastomeric compound, at a temperature preferably between 140° C. and 200° C., to give the vulcanised elastomeric compound.

A further aspect of the present invention is a tyre component comprising the elastomeric compound according to the invention.

A further aspect of the present invention is a tyre for vehicle wheels comprising at least one component of a tyre according to the invention.

DEFINITIONS

The term "elastomeric composition for tyre compounds" means a composition comprising at least one diene elastomeric polymer and one or more additives, which by mixing and possible heating provides an elastomeric compound suitable for use in tyres and their components.

The components of the elastomeric composition are not generally introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable or even more vulcanised elastomeric compound, the individual components of the elastomeric composition may be altered or no longer individually traceable as modified, completely or in part, due to the interaction with the other components, of heat and/or mechanical processing. The term "elastomeric composition" herein is meant to include the set of all the components that are used in the preparation of the elastomeric compound, regardless of whether they are actually present simultaneously, are introduced sequentially or are then traceable in the elastomeric compound or in the final tyre.

The term "elastomeric compound" indicates the compound obtainable by mixing and possibly heating at least one elastomeric polymer with at least one of the additives commonly used in the preparation of tyre compounds.

The term "first elastomeric compound" indicates the compound obtainable by mixing and possibly heating at least one elastomeric polymer with at least one of the additives commonly used in the preparation of tyre compounds, with the exception of vulcanising agents.

The term "vulcanisable elastomeric compound" indicates the elastomeric compound ready for vulcanisation, obtainable by incorporation into a first elastomeric compound of all the additives, including those of vulcanisation.

The term "vulcanised elastomeric compound" means the material obtainable by vulcanisation of a vulcanisable elastomeric compound.

The term "green" indicates a material, a compound, a composition, a component or a tyre not yet vulcanised.

The term "vulcanisation" refers to the cross-linking reaction in a natural or synthetic rubber induced by a sulphur-based and/or peroxide-based vulcanising agent.

The term "reversible cross-linking agent" refers to a compound of formula (I) A-B-C which in vulcanisation binds, at least in part, covalently to the elastomer and, in the presence of the metal cation, is capable of forming a three-dimensional lattice which includes reversible inter- and/or intra-molecular bonds.

The term "vulcanising agent" indicates a product capable of transforming natural or synthetic rubber into elastic and resistant material due to the formation of a three-dimensional lattice of stable inter- and/or intra-molecular bonds. Typically, the vulcanising agent is a sulphur-based compound such as elemental sulphur, polymeric sulphur, sulphurised agents such as bis[(trialkoxysilyl)propyl]polysulphides, thiurams, dithiodimorpholines and caprolactam-disulphide. Alternatively, the vulcanising agent is a peroxide which contains an O—O bond and can generate reactive radicals by heating.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system. In the case of peroxide vulcanising agents, an example of activator is given by polymethacrylates such as ethylene glycol dimethacrylate.

The term "vulcanisation retardant" indicates a product capable of delaying the onset of the vulcanisation reaction and/or suppressing undesired secondary reactions, for example N-(cyclohexylthio)phthalimide (CTP).

The term "vulcanisation package" is meant to indicate the vulcanising agent and one or more vulcanisation additives selected from among vulcanisation activating agents, accelerants and retardants.

The term "elastomeric polymer" indicates a natural or synthetic polymer which, after vulcanisation, may be stretched repeatedly at room temperature to at least twice its original length and after removal of the tensile load substantially immediately returns with force to approximately its original length (according to the definitions of the ASTM D1566-11 Standard terminology relating to Rubber).

The term "diene elastomeric polymer" indicates an elastomeric polymer derived from the polymerization of one or more monomers, of which at least one is a conjugated diene.

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres, derivatives thereof and mixtures thereof.

The term "white filler" is meant to refer to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups.

The term "mixing step (1) or first step" indicates the step of the preparation process of the elastomeric compound in which one or more additives can be incorporated by mixing and possibly heating, except for the vulcanising agent and the vulcanisation package which are fed in step (2). The mixing step (1) is also referred to as "non-productive step". In the preparation of a compound there may be several "non-productive" mixing steps which may be indicated with 1a, 1b, etc.

The term "mixing step (2) or second step" indicates the next step of the preparation process of the elastomeric compound in which the vulcanising agent and, possibly, other additives among which those of the vulcanisation package are introduced into the elastomeric compound obtained from step (1), and mixed in the material, at controlled temperature, generally at a compound temperature lower than 120° C., so as to give the vulcanisable elastomeric compound. The mixing step (2) is also referred to as "productive step". In the preparation of a compound there may be several "productive" mixing steps which may be indicated with 2a, 2b, etc.

The term "ligand" refers to an atom, an ion or a functional group which may bind to a metal cation, for example by donating at least one electron doublet and forming a coordination complex.

The term "monodentate ligand" refers to a ligand capable of donating a single pair of electrons.

The term "multidentate organic ligand" refers to a ligand capable of donating more than one pair of electrons to a single metal cation.

For the purposes of the present description and the following claims, the term "phr" (acronym for parts per hundreds of rubber) indicates the parts by weight of a given elastomeric compound component per 100 parts by weight of the elastomeric polymer, considered net of any plasticising extension oils.

Unless otherwise indicated, all the percentages are expressed as percentages by weight.

BRIEF DESCRIPTION OF THE FIGURES

With reference to the accompanying Figures.

similarly

similarly

similarly

similarly

DETAILED DESCRIPTION OF THE INVENTION

Figure 1:
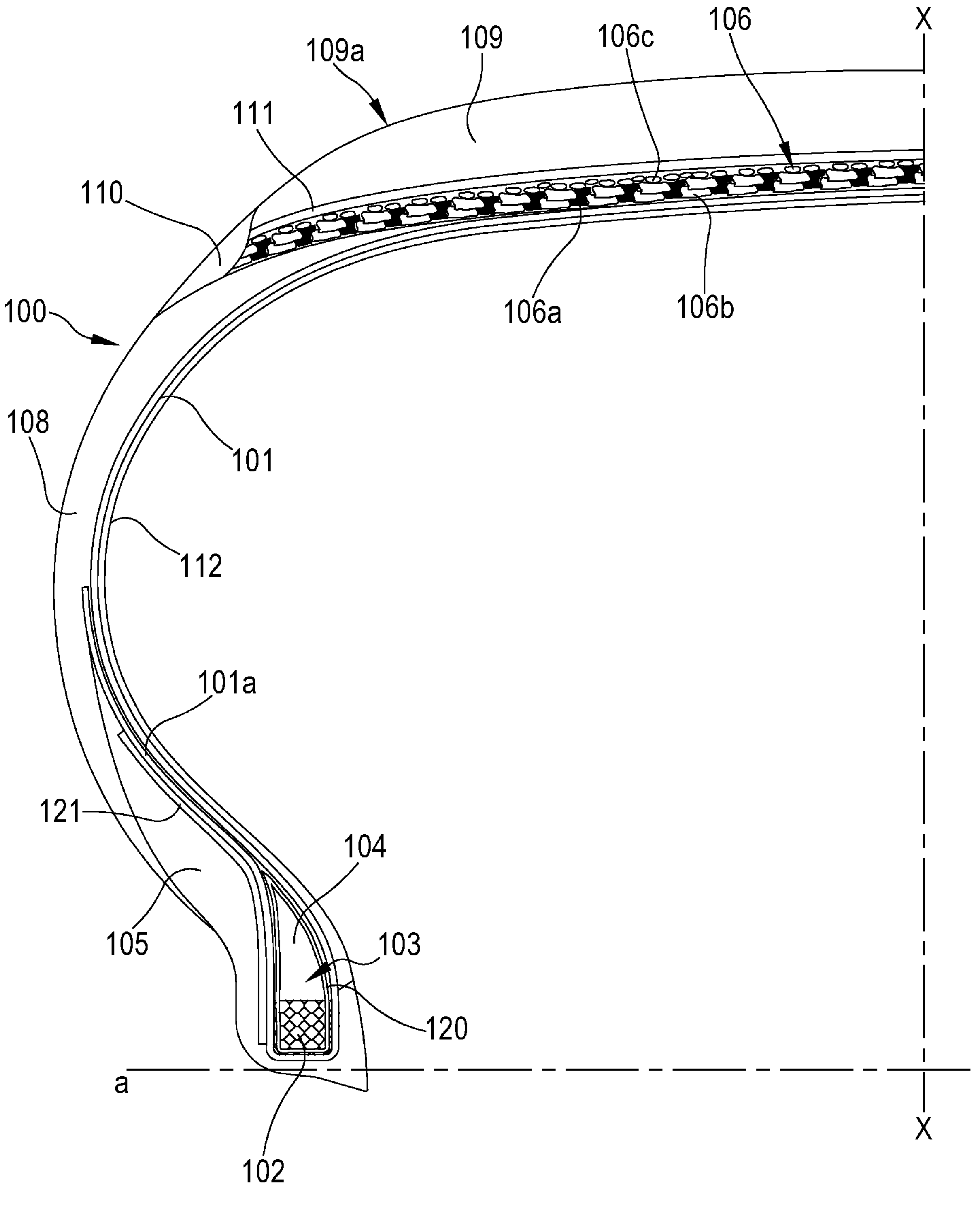
FIG. 1 schematically shows a semi-sectional view of a tyre for vehicle wheels according to the present invention.

The elastomeric composition for tyre compounds according to the present invention is characterized by one or more of the following preferred aspects taken alone or in combination with one another.

The elastomeric composition according to the invention comprises at least 100 phr of at least one diene elastomeric polymer.

The diene elastomeric polymer (A) may be selected from those commonly used in sulphur-vulcanisable elastomeric compositions, which are particularly suitable for producing tyres, i.e. from among solid elastomeric polymers or copolymers with an unsaturated chain having a glass transition temperature (Tg) generally lower than 20° C., preferably in the range from 0° C. to −110° C.

These polymers or copolymers may be of natural origin or may be obtained by solution polymerization, emulsion polymerization or gas-phase polymerization of one or more conjugated dienes, optionally mixed with at least one comonomer, preferably selected from monoolefins, monovinylarenes and/or polar comonomers, typically in an amount not exceeding 60% by weight.

The conjugated dienes generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

The monoolefins can be selected from ethylene and α-olefins generally containing from 3 to 12 carbon atoms, such as for example propylene, 1-butene, 1-pentene, 1-hexene, 1-octene or mixtures thereof.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from among acrylic acid and alkylacrylic acid esters, acrylonitriles, or mixtures thereof, such as, for example, methyl acrylate, ethyl acrylate, methyl methacrylate, ethyl methacrylate, acrylonitrile and mixtures thereof.

Preferably, the diene elastomeric polymer (A) may be selected, for example, from cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

The elastomeric composition may possibly comprise at least one polymer of one or more monoolefins with an olefinic comonomer or derivatives thereof. The monoolefins can be selected from: ethylene and α-olefins generally containing from 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; and mixtures thereof.

The above-mentioned polymers can optionally be functionalised along the main chain or at the ends thereof.

The functional group may be introduced into the elastomeric polymer by processes known in the art such as, for example, during the production of the elastomeric polymer by copolymerisation with at least one corresponding functionalised monomer containing at least one ethylene unsaturation; or by subsequent modification of the elastomeric polymer by grafting at least one functionalised monomer in the presence of a free radical initiator (for example, an organic peroxide).

Alternatively, the functionalisation may be introduced by reaction with suitable terminating agents or coupling agents. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, amines, amides, imines, carbodiimides, alkyltin halides, substituted benzophenones, alkoxysilanes, aryloxy silanes, alkyldithiols, alkyldithiolsilanes, carboxyalkylthiols, carboxyalkylthiolsilanes, and thioglycols.

Useful examples of terminating agents or coupling agents are known in the art and described, for example in patents EP2408626, EP2271682, EP3049447A1, EP2283046A1, EP2895515A1, EP451604, U.S. Pat. No. 4,742,124, WO2015/086039A1 and WO2017/211876A1.

Preferably, said at least one functionalised elastomeric polymer is obtained from polybutadiene (in particular polybutadiene with a high content of 1,4-cis), styrene/1,3-butadiene copolymers, styrene/isoprene/1,3-butadiene copolymers, styrene/1,3-butadiene/acrylonitrile copolymers, and mixtures thereof.

Advantageously, said at least one functionalised elastomeric polymer (b) is obtained from styrene/1,3-butadiene copolymers.

Useful examples of functionalised diene elastomeric polymers are the functionalised styrene butadiene copolymers SPRINTAN™ SLR 3402 e SPRINTAN™ SLR 4602, SPRINTAN™ SLR 4630, manufactured and distributed by Trinseo, PA, USA.

The elastomeric composition according to the invention may comprise two or more elastomeric polymers as defined above, in a mixture.

The elastomeric composition for tyres according to the present invention may comprise at least 0.5 phr, preferably at least 2 phr, more preferably at least 5 phr, of at least one reversible cross-linking agent of formula (I)

A-B-C (I)

The elastomeric composition for tyres according to the present invention may comprise not more than 20 phr, preferably not more than 15 phr, 10 phr or 8 phr of at least one reversible cross-linking agent of formula (I).

Preferably, the elastomeric composition for tyres according to the present invention comprises from 0.5 to 20 phr, preferably from 1 to 15 phr or from 2 to 10 phr, more preferably from 4 to 8 phr of at least one reversible cross-linking agent of formula (I).

In the reversible cross-linking agent of formula (I), A is at least one functional group capable of covalently binding to the elastomeric polymer.

A group may bind to the elastomeric polymers of the compound either directly or through the formation of sulphide bridges.

Preferably, A is a group selected from the activated double bonds, the sulphur groups such as mercapto, di- and polysulphides and thioesters, the reactive phenols having at least one unsubstituted ortho or para position, the precursors of 1,3-dipoles, such as the 2,5-disubstituted tetrazoles described for example in patent application IT102019000025804, the pyrroles substituted in the positions proximal to nitrogen as described for example in WO2020225595A1 and WO20180876851A1 and the diene groups capable of giving Diels-Alder reactions. In one embodiment, A group is an activated double bond.

By activated double bond it is meant a double bond made reactive by conjugated electron-attracting or donor groups, by electron-rich or electron-poor atoms or by particular steric constraints such as the inclusion of the double bond in tensioned cycles.

Examples of activated double bonds are vinyls, unsaturated tensioned cyclic systems and unsaturated alpha-beta bonds, preferred examples are norbornene, methacryl and vinyl ether.

In one embodiment, A group is a sulphur group.

Examples of preferred sulphur groups capable of covalently binding to the elastomeric polymer are the —SH, —S—S—, —S—(S)n-S—, —SC(O)R, —SC(S)R—S—NR'R" wherein R, R' and R" independently represent $C_1$-$C_{20}$alkyl, $C_6$-$C_{20}$ aryl, alkyl-$C_1$-$C_{10}$-aryl-$C_6$-$C_{10}$, aryl-$C_6$-$C_{10}$-alkyl-$C_1$-$C_{10}$, or R' and R" may optionally be fused in a cycle. At least one A group is present in the reversible cross-linking agent of formula (I) but two or more groups A, equal or different from each other, may be present.

In a preferred embodiment, only one A group is present in the reversible cross-linking agent of formula (I).

Typically these functional groups react with the elastomer under normal vulcanisation conditions, forming covalent bonds.

During the reaction, the A group of the reversible cross-linking agent may partially interfere with the sulphur-based vulcanising system present in the compound and bind to the elastomer through polysulphide bridges, thus consuming part of the vulcaniser and, in fact, reducing the extent of the sulphur cross-linking. In these cases, the skilled in the art will be able to suitably modify the sulphur vulcanisation package, varying amounts and components, to compensate for the possible loss in the sulphur cross-linking and restore the normal level thereof.

In the reversible cross-linking agent of formula (I) there is optionally present a B group, i.e. an at least divalent inert organic residue, covalently linked to A and C groups, which acts as a spacer.

Inert organic B residue means an organic residue that is sufficiently stable under normal conditions of processing, vulcanisation and use of the elastomeric compound.

In one embodiment, B group is absent.

An example of a reversible cross-linking agent of formula (I) is the following compound (I-A):

(I-A)

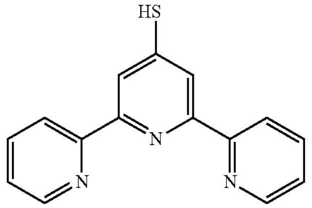

wherein A=SH, B is absent and C=ter-pyridyl.

This compound is described in Example 3 of EP2607381A1.

In one embodiment, B group is present and is selected from alkylene $C_1$-$C_{20}$, arylene $C_6$-$C_{20}$, alkylene-$C_1$-$C_{10}$-arylene-$C_6$-$C_{10}$, arylene-$C_6$-$C_{10}$-alkylene-$C_1$-$C_{10}$, possibly including in the chain one or more heteroatoms such as N, O, S, B, P or Si or one or more functional groups such as for example —COO—, —OCO—, —CONH—, —NHCO—, —OCONH—, —NHCONH—, —CO—, —NH—C(NH)—NH—, —C(S)—S—, —S—C(S)—.

Alkylene and arylene refer to an at least divalent radical obtained by removing at least one hydrogen atom from an alkyl and aryl group, respectively.

Examples of preferred divalent B groups are —O—$CH_2$—, —O—$(CH_2)_6$—, —O—$(CH_2)_{10}$—, —O—

$(CH_2)_{11}$, —O—C(O)—NH—$(CH_2)_6$—NH—C(O)—O—, NH—C(O)—NH—, —$(CH_2)_6$—NH—C(O)—. Preferably, the B group has a molecular weight lower than 2000 g/mol, more preferably lower than 1000 g/mol, even more preferably lower than 500 g/mol.

In the reversible cross-linking agent of formula (I), C is a multidentate organic ligand capable of reversibly coordinating at least one metal cation.

The multidentate organic C ligand is an at least bidentate organic ligand, preferably it is at least tridentate, more preferably it is tridentate.

The multidentate organic C ligand may be charged or neutral, preferably it is neutral.

The multidentate organic C ligand comprises at least two heteroatoms, preferably selected from N, P, S and O, more preferably at least two nitrogen atoms, capable of forming coordination bonds with the metal cation.

Preferably, the multidentate organic C ligand comprises at least two monodentate ligand residues such as for example the ligands described in Coordin. Chem. Rev. (1973), 9 (3-4), 219-274, in particular 237-246, par. E, subpar. i) and ii); Helv. Chim. Acta (1993), 76, 372-384; Coordin. Chem. Rev. (1997), 160, 1-52, in particular 18-24, par. 3.2.3; Inorg. Chem. (2009), 48, 1132-1147; Chem. Eur. J. (2016), 22, 17892-17908, in particular 17894-17901; Molecules (2020), 25(21), 4984-5008.

Preferably, the multidentate organic C ligand comprises at least one mono- or polycyclic, 5- or 6-terms ring heterocycle, saturated, unsaturated or aromatic, possibly benzocondensate, comprising at least one heteroatom selected from N, P, S and O.

Preferably, the multidentate organic C ligand comprises at least one nitrogen heterocycle selected from pyridine, bipyridine, terpyridine, pyrazine, pyrimidine, pyridazine, imidazole, pyrrole, pyrazole, indole, 1,10-phenanthroline, quinoline, isoquinoline, triazole, tetrazole, triazine, tetrazine, substituted or unsubstituted, possibly benzocondensate, more preferably, the multidentate organic C ligand comprises at least one nitrogenous heterocycle selected from pyridine and benzimidazole.

The skilled in the art, by appropriately selecting the C ligand and its substituents, is capable of modulating the coordination capacity of the ligand itself and therefore of conveniently shifting the equilibrium of the cross-linking/uncross-linking reaction as a function of the temperatures of interest for the present tyre applications.

Examples of ligands C are the compounds of formula (II), (III) and (IV) described below.

Examples of tridentate C ligand (II) are the tripyridines of formula (II-A):

(II-A)

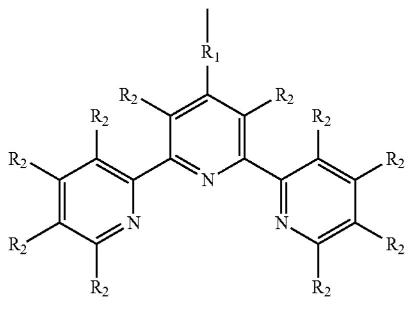

wherein R1 is B group, and R2 are independently selected from H and linear or branched $C_2$-$C_6$ alkyl.

An example of a particularly preferred tridentate C ligand (II) of the bis(benzimidazol) pyridine class is 2,6-bis(1-methylbenzimidazol-2-yl)-pyridine-4-yl (MeBIP) of formula:

(II-B)

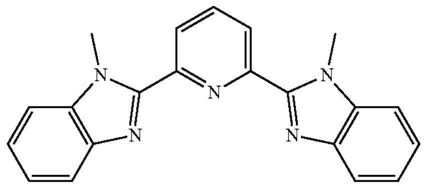

Examples of bidentate ligands C are the compounds of formula (III) or (IV):

(III)

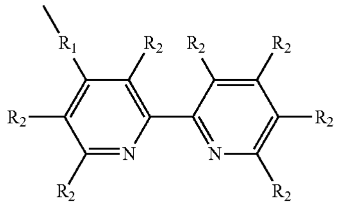

(IV)

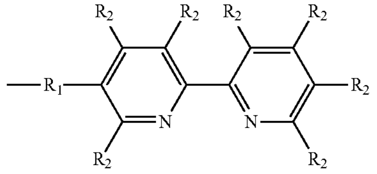

wherein R1 is B group, and R2 are independently selected from H and linear or branched $C_2$-$C_6$ alkyl.

The ligands of formula (II-A), (III) and (IV) are described in EP2607381A1 while the preparation of a reversible cross-linking agent of formula (I) comprising the ligand (II-B) is described in the present experimental part.

At least one group multidentate organic C ligand is present in the reversible cross-linking agent of formula (I) but two or more ligands C, equal or different from each other, may be present.

In a preferred embodiment, only one C ligand is present in the reversible cross-linking agent of formula (I).

In one embodiment, in the reversible cross-linking agent of formula (I)

A-B-C (I)

only one A group is present, only one C ligand and B group is absent.

In a preferred embodiment, in the reversible cross-linking agent of formula (I)

A-B-C (I)

only one A group is present, only one C ligand and B group is present and is divalent.

Particularly preferred reversible cross-linking agents are the agents of formula (I) wherein A=SH or norbornyl, B=$-O-(CH_2)_{1-11}-$ and C=a bis(benzimidazol)pyridyl, in particular 2,6-bis(1-methylbenzimidazol-2-yl)-pyridine-4-yl.

The elastomeric composition according to the invention preferably comprises at least 0.2 phr, at least 0.5 phr, more preferably at least 0.7 phr of at least one salt of a metal cation capable of forming complexes with the multidentate organic C ligand of the reversible cross-linking agent of formula (I).

Preferably, the elastomeric composition comprises not more than 10 phr, more preferably not more 7 phr of at least one salt of the metal cation, even more preferably not more 3 phr of at least one salt of the metal cation.

Preferably, the elastomeric composition comprises from 0.2 phr to 7 phr, more preferably from 0.7 phr to 3 phr of at least one salt of the metal cation.

Preferably, the elastomeric composition comprises not more than 6% by weight, more preferably not more than 3% by weight, even more preferably no more than 2% by weight of at least one salt of the metal cation.

Preferably, the molar ratio of reversible cross-linking agent (I) to the salt of the metal cation is between 6:1 and 0.5:1, more preferably between 4:1 and 1:1, even more preferably between 4:1 and 2:1.

Such ratio varies according to the type of multidentate C ligand and the metal cation. Preferably, the molar ratio between the reversible cross-linking agent of formula (I) and the salt of the metal cation is the stoichiometric one which allows the formation of the most effective complex in giving the desired reversible cross-linking, i.e. the one in which the metal cation is complexed by at least two C ligand groups belonging to different molecules of reversible cross-linking agents of formula (I), in turn bound to the elastomeric polymer.

The aforesaid stoichiometric ratio between the reversible cross-linking agent of formula (I) and the salt of the metal cation depends on the coordination number of the metal cation and on the coordination centres of the ligand, and is typically between 2:1 and 4:1. However, it is possible that in the compound the ligand or the metal are not completely involved in forming the desired complexes, therefore it will be possible and technologically convenient to select ratios other than the theoretical stoichiometric ones.

The elastomeric composition according to the invention may comprise a salt of the metal cation or more in mixture.

The salt of the metal cation comprises a metal cation and an anion.

The metal cation may be any metal cation capable of forming complexes with ligands.

The metal cation is preferably a divalent or trivalent cation, more preferably divalent. Preferably, the metal cation is selected from alkaline earth metals (2A group), transition metals and lanthanides, more preferably from $Cu^{2+}$, $Fe^{2+}$, $Zn^{2+}$, $Mg^{2+}$, $Ca^{2+}$, $Ru^{3+}$, $Tb^{3+}$ and $Eu^{3+}$, even more preferably it is selected from $Zn^{2+}$ or $Tb^{3+}$.

The elastomeric composition according to the invention may furthermore comprise possible other salts which are not however capable of forming complexes with the multidentate organic C ligand of the reversible cross-linking agent of formula (I), such as for example zinc stearate and zinc octoate.

The anion of the salt of the metal cation according to the invention is preferably a non-coordinating or weakly coordinating anion (WCA).

By the term weakly coordinating anion, now commonly used in general chemistry, it is meant to indicate those anions that interact weakly with cations, typically having the charge delocalised on the whole surface of the anion rather than localised on a specific atom. The properties characterising a weakly coordinating anion are reported for example in Chem. Rev. (1993), 93 (3), 927-942, in particular on page 929, par. II, subpar. C.

Preferably, the anion of the salt of the metal cation is an anion which tends to complex the metal cation more weakly than the C ligand of the present reversible cross-linking agent of formula (I). In the present experimental part (Example 2, Table 1) a possible method is illustrated, useful to guide the skilled in the art in the selection of suitable anions, based on complexation studies.

Some examples of weakly coordinating anions are described in Chem. Rev. (1993), 93 (3), 927-942; Angew. Chem. Int. Edit. (2004), 43 (16), 2066-2090; Angew. Chem. Int. Edit. (2018), 57 (43), 13982-14024; Chem. Soc. Rev. (2016), 45, 789-899.

Examples of suitable anions are tosylate, triflate, bistriflimide and borates, including perfluorinated ones.

Preferably, the anion is triflate.

Preferably, the salt of the metal cation comprises the metal cation $Zn^{2+}$ or $Th^{3+}$ and a weakly coordinating anion selected from tosylate, bistriflimide, triflate, more preferably the salt of the metal cation is zinc triflate.

Preferably, the salt of the metal cation is rather soluble in the elastomeric polymer of the present composition.

The elastomeric composition for tyres according to the present invention may comprise at least 0.5 phr of at least one reinforcing filler.

The present composition may comprise from 1 phr to 150 phr, from 5 phr to 120 phr or from 10 phr to 90 phr of at least one reinforcing filler.

Preferably, the reinforcing filler is selected from carbon black, white fillers, silicate fibres, derivatives thereof and mixtures thereof.

In an embodiment, said reinforcing filler is a white filler selected from among hydroxides, oxides and hydrated oxides, salts and hydrated salts of metals, silicates fibres, derivatives thereof and mixtures thereof. Preferably, said white filler is silica. Preferably, said silica may be present in the elastomeric composition in an amount ranging between 1 phr and 100 phr, more preferably between 30 phr and 70 phr. Commercial examples of suitable silica are Zeosil 1165 MP, Zeosil 1115 MP, Zeosil 185 GR, Efficium from Solvay, Newsil HD90 and Newsil HD200 from Wuxi, K160 and K195 from Wilmar, H160AT and H180 AT from IQE, Zeopol 8755 and 8745 from Huber, Perkasil TF100 from Grace, Hi-Sil EZ 120 G, EZ 160G, EZ 200G from PPG, Ultrasil 7000 GR and Ultrasil 9100 GR from Evonik.

In one embodiment, said reinforcing filler comprises silica mixed with carbon black. In one embodiment, said reinforcing filler comprises a modified silica.

Silica can be modified for example by reaction with silsequioxanes (as in WO2018078480A1), by reaction with pyrroles (as in WO2016050887A1) or by reaction with silanising agents, such as bis(triethoxysilylpropyl)tetrasulphide (TESPT), 3-aminopropyltriethoxysilane (APTES) 3-glycidyloxypropyltriethoxysilane triethoxy(octyl)silane, triethoxy(ethyl)silane, triethoxy-3-(2-imidazolin-1-yl)propylsilane, triethoxy-p-tolylsilane, triethoxy(1-phenylethenyl)silane, triethoxy-2-thienylsilane, 1H,1H,2H,2H-perfluorooctyltriethoxysilane, 3-(triethoxysilyl)propyl isocyanate, 1H,1H,2H,2H-perfluorodecylthriethoxysilane, isobutyltriethoxysilane, n-octadecyltriethoxysilane, (3-chloropropyl) triethoxysilane, triethoxysilane and 3-(triethoxysilyl)propionitrile.

Commercial examples of suitable silanising agents are Si69, Dynasilan AMEO and Dynasilan GLYEO from Evonik.

The modified silica may be a sulphurised silanised silica.

Sulphurised silanised silica is a silica prepared by reaction of a silica, such as fumed silica, precipitated amorphous silica, wet silica (hydrated silicic acid), anhydrous silica (anhydrous silicic acid), or mixtures thereof, or of a metal silicate, such as aluminium silicate, sodium silicate, potassium silicate, lithium silicate or mixtures thereof, with at least one sulphurised silanising agent.

The term "sulphurised silanising agent" indicates an organic derivative of silicon containing mercapto, sulphide, disulphide or polysulphide groups, said derivative being capable of reacting with the OH groups of silica.

A commercial example of suitable sulphurised silanised silica is Agilon 400 silica from PPG.

In one embodiment, said reinforcing filler comprises a modified silica mixed with carbon black.

In one embodiment, said reinforcing filler comprises silicates.

In one embodiment, said silicates are lamellar silicates, such as bentonites, alloysite, laponite, saponite, vermiculite or hydrotalcite.

In one embodiment, said silicates are modified lamellar silicates analogously to what is described below for modified silicate fibres.

In one embodiment, said silicates are silicate fibres. These fibres typically have nano dimensions and have needle-like morphology.

The silicate fibres are preferably selected from sepiolite fibres, paligorskite fibres (also known as attapulgite), wollastonite fibres, imogolite fibres and mixtures thereof.

In one embodiment, said reinforcing filler comprises silicate fibres mixed with carbon black.

In one embodiment, said silicate fibres are modified silicate fibres.

In one embodiment, the modified silicate fibres can be for example fibres modified by acid treatment with partial removal of magnesium, such as those described and exemplified in patent application WO2016174629A1.

In one embodiment, the modified silicate fibres can be for example fibres modified by deposition of amorphous silica on the surface, such as those described and exemplified in patent application WO2016174628A1.

In one embodiment, the modified silicate fibres can be fibres organically modified by reaction, for example, with quaternary ammonium salts such as sepiolite fibres modified by reaction with talloyl benzyl dimethyl ammonium chloride marketed by Tolsa under the name Pangel B5.

In one embodiment, the modified silicate fibres can be fibres modified by reaction with a silanising agent selected for example from mono or bifunctional silanes with one or two or three hydrolysable groups such as bis-(3-triethoxysilyl-propyl)disulphide (TESPD), bis(3-triethoxysilyl-propyl) tetrasulphide (TESPT), 3-thio-octanoyl-1-propyl-triethoxysilane (NXT), $Me_2Si(OEt)_2$, $Me_2PhSiCl$, $Ph_2SiCl_2$.

In one embodiment, said reinforcing filler is carbon black.

Preferably, said carbon black is present in the elastomeric composition in an amount ranging between 1 phr and 100 phr, preferably between 5 phr and 70 phr.

Preferably, the carbon black is selected from those having a surface area not smaller than 20 $m^2/g$, preferably larger than 50 $m^2/g$ (as determined by STSA—statistical thickness surface area according to ISO 18852:2005).

Carbon black may be for example N110, N115, N121, N134, N220, N234, N326, N330, N375 or N550, N660 marketed by Birla Group (India) or by Cabot Corporation, Vulcan@ 1391 supplied by Cabot Corporation or Birla Carbon™ 2115 supplied by Birla Group.

The elastomeric composition for tyre compounds according to the invention may comprise from 0.1 to 10 phr of a vulcanising agent.

Preferably, the composition comprises at least 0.2 phr, 0.5 phr, 0.8 phr or 1 phr of at least one vulcanising agent.

Preferably, the composition comprises from 0.1 to 10 phr, from 0.2 to 10 phr, from 1 to 10 phr or from 1.5 to 5 phr of at least one vulcanising agent.

The at least one vulcanising agent is preferably selected from sulphur, sulphurised agents (sulphur donors), such as, for example, bis[(trialkoxysilyl)propyl]polysulphides, caprolactam-disulphide or peroxides and mixtures thereof.

Preferably, the vulcanising agent is sulphur, preferably selected from soluble sulphur (crystalline sulphur), insoluble sulphur (polymeric sulphur), (iii) oil-dispersed sulphur and mixtures thereof.

Commercial example of a vulcanising agent suitable for use in the elastomeric composition of the invention is the Redball Superfine sulphur of International sulphur Inc.

In the present elastomeric composition, the vulcanising agent may be used together with adjuvants such as vulcanisation activators, accelerants and/or retardants known to those skilled in the art.

The elastomeric composition according to the invention may optionally comprise at least one vulcanisation activator.

The vulcanisation activating agents suitable for use in the present elastomeric composition are zinc compounds, in particular ZnO, $ZnCO_3$, zinc salts of saturated or unsaturated fatty acids containing from 8 to 18 carbon atoms, which are preferably formed in situ in the elastomeric composition by reaction of ZnO and of the fatty acid or mixtures thereof. For example, zinc stearate is used, preferably formed in situ in the elastomeric composition, by ZnO and fatty acid, or magnesium stearate, formed by MgO, or mixtures thereof.

The vulcanisation activating agents may be present in the elastomeric composition of the invention in amounts preferably from 0.2 phr to 15 phr, more preferably from 1 phr to 5 phr.

Preferred activating agents derive from the reaction of zinc oxide and stearic acid. An example of activator is the product Aktiplast ST marketed by Rheinchemie.

The elastomeric composition according to the invention may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

Preferably, the accelerant agent is selected from mercaptobenzothiazole (MBT), N-cyclohexyl-2-benzothiazol-sulphenamide (CBS), N-tert-butyl-2-benzothiazol-sulphenamide (TBBS) and mixtures thereof.

Commercial examples of accelerants suitable for use in the present elastomeric composition are N-cyclohexyl-2-benzothiazyl-sulphenamide Vulkacit® (CBS or CZ), and N-terbutyl 2-benzothiazil sulphenamide, Vulkacit® NZ/EGC marketed by Lanxess.

Vulcanisation accelerants may be used in the present elastomeric composition in an amount preferably from 0.05 phr to 10 phr, preferably from 0.1 phr to 7 phr, more preferably from 0.5 phr to 5 phr.

The elastomeric composition according to the invention may optionally comprise at least one vulcanisation retardant agent.

The vulcanisation retardant agent suitable for use in the present elastomeric composition is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present elastomeric composition in an amount of preferably from 0.05 phr to 2 phr.

The present elastomeric composition may comprise one or more vulcanisation retardant agents as defined above in a mixture.

The elastomeric composition according to the invention may further comprise at least 0.05 phr, preferably at least 0.1 phr or 0.5 phr, more preferably at least 1 phr or 2 phr of at least one silane coupling agent.

Preferably, the elastomeric composition according to the invention comprises from 0.1 phr to 20.0 phr or from 0.5 phr to 10.0 phr, even more preferably from 1.0 phr to 5.0 phr of at least one silane coupling agent.

Preferably, said coupling agent is a silane coupling agent selected from those having at least one hydrolysable silane group which may be identified, for example, by the following general formula (III):

$$(R')_3Si—C_nH_{2n}—X \quad (III)$$

wherein the groups R', equal or different from each other, are selected from: alkyl, alkoxy or aryloxy groups or from halogen atoms, provided that at least one of the groups R' is an alkoxy or an aryloxy group; n is an integer of from 1 to 6; X is a group selected from: nitrose, mercapto, amino, epoxide, vinyl, imide, chloro, $—(S)_mC_nH_{2n}—Si—(R')_3$ and —S—COR', wherein m and n are integers of from 1 to 6 and the R' groups are as defined above.

Particularly preferred silane coupling agents are bis(3-triethoxysilylpropyl)tetrasulphide and bis(3-triethoxysilylpropyl)disulphide. Said coupling agents may be added as such or in mixture with an inert filler (such as carbon black) so as to facilitate their incorporation into the elastomeric composition. An example of the silane coupling agent is TESPT: bis(3-triethoxysilylpropyl)tetrasulphide Si69 marketed by Evonik.

The elastomeric composition according to the invention may further comprise one or more additional ingredients, commonly used in the field, such as for example plasticising oils, resins, antioxidant and/or antiozonating agents (anti-aging agents), waxes, adhesives and the like.

For example, the elastomeric composition according to the present invention, in order to further improve the workability of the compound, may further comprise at least one plasticising oil.

The amount of plasticiser is preferably in the range from 5 to 25 phr, preferably from 8 to 20 phr.

The term "plasticising oil" means a process oil derived from petroleum or a mineral oil or a vegetable oil or a synthetic oil or combinations thereof.

The plasticising oil may be a process oil derived from petroleum selected from paraffins (saturated hydrocarbons), naphthenes, aromatic polycyclic and mixtures thereof.

Examples of suitable process oils derived from petroleum are aromatic, paraffinic, naphthenic oils such as MES (Mild Extract Solvated), DAE (Distillate Aromatic Extract), TDAE (Treated Distillate Aromatic Extract), TRAE (Treated Residual Aromatic Extract), RAE (Residual Aromatic Extract) known in the industry.

The plasticising oil may be an oil of natural or synthetic origin derived from the esterification of glycerol with fatty acids, comprising glycerine triglycerides, diglycerides, monoglycerides or mixtures thereof.

Examples of suitable vegetable oils are sunflower, soybean, linseed, rapeseed, castor and cotton oil.

The plasticising oil may be a synthetic oil selected from among the alkyl or aryl esters of phthalic acid or phosphoric acid.

The elastomeric composition according to the present invention may further comprise at least one resin.

The resin is a non-reactive resin, preferably selected from among hydrocarbon resins, phenolic resins, natural resins and mixtures thereof.

The amount of resin is preferably in the range from 5 to 25 phr, more preferably from 7 to 20 phr.

The elastomeric composition according to the invention may optionally comprise at least one wax.

The wax may be for example a petroleum wax or a mixture of paraffins.

Commercial examples of suitable waxes are the Repsol N-paraffin mixture and the Antilux® 654 microcrystalline wax from Rhein Chemie.

The wax may be present in the elastomeric composition of the invention in an overall amount generally from 0.1 phr to 20 phr, preferably from 0.5 phr to 10 phr, more preferably from 1 phr to 5 phr.

The elastomeric composition according to the invention may optionally comprise at least one antioxidant agent.

The antioxidant agent is preferably selected from N-isopropyl-N'-phenyl-p-phenylenediamine (IPPD), N—(-1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like, and mixtures thereof, preferably it is N-1,3-dimethylbutyl-N-phenyl-p-phenylenediamine (6-PPD).

A commercial example of a suitable antioxidant agent is 6PPD from Solutia or Santoflex produced by Eastman.

The antioxidant agent may be present in the elastomeric composition in an overall amount preferably from 0.1 phr to 20 phr, more preferably from 0.5 phr to 10 phr.

A further aspect of the present invention is a vulcanised elastomeric compound for tyres obtained by mixing and vulcanising the elastomeric composition according to the invention.

The elastomeric compound of the invention is characterised by a particular hysteresis pattern.

In fact, unlike conventional elastomeric compounds (for example reference compound 1, FIG. 4*a*) where the hysteresis has a decreasing monotonic pattern as T increases, the compound of the invention instead has non-decreasing Tan delta values (for example compound 3, FIG. 4*c*) or even increasing (for example compound 2, FIG. 4*b*) as the T increases, i.e. once the temperature corresponding to normal driving has been exceeded and thus one has entered into the sports driving speed. The comparison between the Tan delta pattern of compounds 1-3 is shown in the summary FIG. 5.

Furthermore, the elastomeric compound of the invention (2, 3) has improved static properties at break (see Table 3), maintaining modules and hardnesses close to those of the reference compound, thus showing that the reversible cross-linking agent of the invention does not distort the properties of the compound in which it is inserted, in particular it does not induce cold hardening of the compound, as instead occurs with the functionalised SBRs described in Macromolecules (2016), 49, 1781-1789.

A further aspect of the present invention is a process for preparing the vulcanised elastomeric compound according to the invention, comprising a first non-productive step and a second productive step, preferably comprising:

in the first non-productive step, mixing at least one diene elastomeric polymer, at least one reinforcing filler and at least one reversible cross-linking agent of formula (I) and possibly at least one antioxidant, a vulcanisation activating agent, a compatibilising agent, an antiozonant and/or a wax, preferably at a temperature between 110 and 190° C., to give a first elastomeric compound, in the second productive step, adding to the first elastomeric compound at least one vulcanising agent, at least one salt of the metal cation and possibly at least one accelerant agent, a retardant agent, a compatibilising agent, a vulcanisation activating agent and/or a peroxide, and mixing the components at a temperature preferably lower than 120° C., to give a vulcanisable elastomeric compound, and vulcanising the vulcanisable elastomeric compound, at a temperature preferably between 150° C. and 200° C., to give the vulcanised elastomeric compound.

In one embodiment of the present process, the reversible cross-linking agent of formula (I) and the salt of the metal cation are both added in the first non-productive step.

In an embodiment of the present process, the reversible cross-linking agent of formula (I) and the salt of the metal cation are both added in the second productive step.

In a preferred embodiment of the present process, the reversible cross-linking agent of formula (I) is added in the first non-productive step while the metal cation salt in the second productive step.

In an embodiment of the present process, the reversible cross-linking agent of formula (I) and the salt of the metal cation are made to pre-react, i.e. the complex between the reversible cross-linking agent of formula (I) and the metal cation is prepared first and, subsequently, the preformed complex is added and mixed in the second productive step.

The process according to the invention typically comprises one or more thermomechanical mixing steps in at least one suitable mixer, in particular at least a first mixing step (step 1—non-productive) and a second mixing step (step 2—productive) as defined above.

Each mixing step may comprise several intermediate processing steps or sub-steps, characterised by the momentary interruption of the mixing to allow the addition of one or more ingredients but without intermediate discharge of the compound.

The mixing may be performed, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

Generally, but not necessarily, at the end of step 1 the first elastomeric compound is discharged and after a variable period of time it is recharged in the same or another suitable mixer, for the subsequent productive step 2.

In productive step 2, the temperature is generally controlled to avoid undesired pre-vulcanisation phenomena.

At the end of the second step, the vulcanisable elastomeric compound is incorporated into one or more components of the green tyre, preferably in the tread band, and subjected to vulcanisation, according to known techniques.

Any of the usual vulcanisation processes may be used in the present process, such as heating in a press or mould, heating with superheated steam or hot air.

The tyres may be built, formed, moulded and vulcanised with various methods known to the skilled in the art.

A further aspect of the present invention is a tyre component for vehicle wheels comprising, or preferably consisting of, an elastomeric compound according to the invention, preferably selected from the tread band, under-layer, anti-abrasive strip, sidewall, sidewall insert, mini-sidewall, liner, under-liner, rubber layers, bead filler, bead reinforcing layers (flipper), bead protection layers (chafer), sheet. Preferably, the tyre component is a tread band, an anti-abrasive strip or a sidewall.

The green tyre component is produced with the vulcanisable elastomeric compound and then vulcanised, preferably together with the other components, to give the vulcanised tyre component.

A further aspect of the present invention is a tyre for vehicle wheels comprising at least one of the components according to the invention.

Preferably, said component is a tread band.

In one embodiment, a tyre for vehicles according to the present invention comprises at least a carcass structure comprising at least a carcass ply having opposite lateral edges associated to respective bead structure;

possibly a pair of sidewalls applied to the lateral surfaces of the carcass structure, respectively, in an axially outer position;

possibly a belt structure applied in radially outer position with respect to the carcass structure;

a tread band applied in a radially outer position to said carcass structure or, if present, a belt structure, possibly a layer of elastomeric material, referred to as under-layer, applied in a radially inner position with respect to said tread band, wherein at least one component, preferably the tread band, the anti-abrasive strip and/or the sidewalls, comprise, or preferably consist of, the elastomeric compound according to the invention.

The tyre according to the invention may be for summer, winter use or for all seasons.

In one embodiment, the tyre according to the invention is a tyre for a passenger car, with normal or high performance or for off-road vehicles, preferably a tyre for passengers, conceived for vehicles for personal use, such as sedans, coupes, crossovers, SUVs, minivans and small pickups.

In one embodiment, the tyre according to the invention is a tyre for motorcycles, wherein at least one component comprises, or preferably consists of, the elastomeric compound according to the invention.

The tyre according to the invention may be a tyre for two, three or four-wheeled vehicles.

In one embodiment, the tyre according to the invention is a tyre for bicycle wheels.

A tyre for bicycle wheels typically comprises a carcass structure turned around a pair of bead cores at the beads and a tread band arranged in a radially outer position with respect to the carcass structure. Preferably, at least the tread band comprises the elastomeric compound according to the invention.

The tyre according to the present invention may be produced according to a process which comprises:

building components of a green tyre on at least one forming drum;

shaping, moulding and vulcanising the tyre;

wherein building at least one of the components of a green tyre comprises:

manufacturing at least one green component, preferably the tread band, comprising, or preferably consisting of, the vulcanisable elastomeric compound of the invention.

Description of a Tyre According to the Invention

A tyre for vehicle wheels according to the invention, comprising at least one component comprising the present elastomeric compound, is illustrated in radial half-section in FIG. 1.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

The tyre (100) for four-wheeled vehicles comprises at least one carcass structure, comprising at least one carcass layer (101) having respectively opposite end flaps engaged with respective annular anchoring structures (102), referred to as bead cores, possibly associated to a bead filler (104).

The tyre area comprising the bead core (102) and the filler (104) forms a bead structure (103) intended for anchoring the tyre onto a corresponding mounting rim, not shown.

The carcass structure is usually of radial type, i.e. the reinforcing elements of the at least one carcass layer (101) lie on planes comprising the rotational axis of the tyre and substantially perpendicular to the equatorial plane of the tyre. Said reinforcing elements generally consist of textile cords, such as rayon, nylon, polyester (for example polyethylene naphthalate, PEN). Each bead structure is associated to the carcass structure by folding back of the opposite lateral edges of the at least one carcass layer (101) around the annular anchoring structure (102) so as to form the so-called carcass flaps (101*a*) as shown in FIG. 1.

In one embodiment, the coupling between the carcass structure and the bead structure can be provided by a second carcass layer, not shown in FIG. 1, applied in an axially outer position with respect to the first carcass layer.

An anti-abrasive strip (105) possibly made with elastomeric material is arranged in an outer position of each bead structure (103).

The carcass structure is associated to a belt structure (106) comprising one or more belt layers (106*a*), (106*b*) placed in radial superposition with respect to one another and with respect to the carcass layer, having typically textile and/or metallic reinforcing cords incorporated within a layer of elastomeric material.

Such reinforcing cords may have crossed orientation with respect to a direction of circumferential development of the tyre (100). By "circumferential" direction it is meant a direction generally facing in the direction of rotation of the tyre.

At least one zero-degree reinforcing layer (106*c*), commonly known as a "0° belt", may be applied in a radially outermost position to the belt layers (106*a*), (106*b*), which generally incorporates a plurality of elongated reinforcing elements, typically metallic or textile cords, oriented in a substantially circumferential direction, thus forming an angle of a few degrees (such as an angle of between about 0° and 6°) with respect to a direction parallel to the equatorial plane of the tyre, and coated with an elastomeric material.

A tread band (109) comprising the elastomeric compound according to the invention is applied in a position radially outer to the belt structure (106).

Moreover, respective sidewalls (108) of elastomeric material are applied in an axially outer position on the lateral surfaces of the carcass structure, each extending from one of the lateral edges of tread (109) at the respective bead structure (103).

In a radially outer position, the tread band (109) has a rolling surface (109*a*) intended to come in contact with the ground. Circumferential grooves, which are connected by transverse notches (not shown in FIG. 1) so as to define a plurality of blocks of various shapes and sizes distributed over the rolling surface (109*a*), are generally made on this surface (109*a*), which for simplicity is represented smooth in FIG. 1. An under-layer (111) of elastomeric material may be arranged between the belt structure (106) and the tread band (109).

A strip consisting of elastomeric material (110), commonly known as "mini-sidewall", can optionally be provided in the connecting zone between the sidewalls (108) and the tread band (109), this mini-sidewall being generally obtained by co-extrusion with the tread band (109) and allowing an improvement of the mechanical interaction between the tread band (109) and the sidewalls (108). Preferably, the end portion of the sidewall (108) directly covers the lateral edge of the tread band (109).

In the case of tubeless tyres, a rubber layer 112, generally known as "liner", which provides the necessary impermeability to the inflation air of the tyre, can also be provided in a radially internal position with respect to the carcass layer 101.

The rigidity of the tyre sidewall 108 may be improved by providing the bead structure 103 with a reinforcing layer 120 generally known as "flipper" or additional strip-like insert.

The flipper 120 is a reinforcing layer which is wrapped around the respective bead core 102 and the bead filler 104 so as to at least partially surround them, said reinforcing layer being arranged between the at least one carcass layer 101 and the bead structure 103. Usually, the flipper is in contact with said at least one carcass layer (101) and said bead structure (103).

The flipper 120 typically comprises a plurality of textile cords incorporated within a layer of elastomeric material.

The reinforcing annular structure or bead (103) of the tyre may comprise a further protective layer which is generally known by the term of "chafer" (121) or protective strip and which has the function of increasing the rigidity and integrity of the bead structure (103).

The chafer (121) usually comprises a plurality of cords incorporated within a rubber layer of elastomeric material. Such cords are generally made of textile materials (such as aramide or rayon) or metal materials (such as steel cords).

A layer or sheet of elastomeric material can be arranged between the belt structure and the carcass structure (not shown). The layer may have a uniform thickness. Alternatively, the layer may have a variable thickness in the axial direction. For example, the layer may have a greater thickness close to its axially outer edges with respect to the central (crown) zone.

Advantageously, the layer or sheet may extend on a surface substantially corresponding to the extension surface of said belt structure.

In a preferred embodiment, a layer of elastomeric material, referred to as under-layer (111), may be placed between said belt structure and said tread band, said under-layer preferably extending on a surface substantially corresponding to the extension surface of said belt structure.

The elastomeric compound according to the present invention may advantageously be incorporated in one or more of the above tyre components, preferably in the tread band, in the anti-abrasive strip or in the sidewall.

The building of the tyre (100) as described above, may be carried out by assembling respective semi-finished products consisting of the respective green compounds, semi-finished products adapted to form the components of the tyre, on a forming drum, not shown, by at least one assembling device.

At least a part of the components intended to form the carcass structure of the tyre may be built and/or assembled on the forming drum. More particularly, the forming drum is intended to first receive the possible liner, and then the carcass structure. Thereafter, devices non shown coaxially engage one of the annular anchoring structures around each of the end flaps, position an outer sleeve comprising the belt structure and the tread band in a coaxially centred position around the cylindrical carcass sleeve and shape the carcass sleeve according to a toroidal configuration through a radial expansion of the carcass structure, so as to cause the application thereof against a radially inner surface of the outer sleeve.

After building of green tyre, a moulding and vulcanisation treatment is generally carried out in order to determine the structural stabilisation of the tyre through cross-linking of the elastomeric compositions, as well as to impart a desired tread pattern on the tread band and to impart any distinguishing graphic signs at sidewalls.

EXPERIMENTAL PART

Methods of Analysis

Thermogravimetric Analysis (TGA)

The thermogravimetric measurements were carried out with a Mettler-Toledo STAR device under inert conditions under an atmosphere of $N_2$ and on samples weighing between 8 and 10 mg. The measurement contemplated a constant increase of 10° C./min in the temperature range of from 25 to 600° C.

Differential Scanning Calorimetric Analysis (DSC)

The calorimetry measurements were carried out with a Mettler-Toledo STAR device under inert conditions under an atmosphere of $N_2$ and on samples weighing between 8 and 10 mg. The measurement included heating/cooling cycles at a rate of 10° C./min in the temperature range from −80 to +250° C.

Spectrophotometric Analysis (UV-VIS)

The spectrophotometric measurements were carried out with a Shimadzu UV-2401 PC spectrophotometer, in Acetonitrile or in Chloroform:Acetonitrile (9:1). For the measurements, quartz cuvettes (1 cm) produced by Hellma were used.

$^1$H-NMR Assay

Nuclear magnetic resonance (NMR) spectroscopy was conducted with a Bruker Avance DPX 400 spectrometer at frequencies of 400.19 MHz for $^1$H and 100.63 MHz for $^{13}$C. The spectra obtained were calibrated on the residual signal of the solvent used ($CD_2Cl_2$: 5.32 ppm $^1$H; 53.84 ppm $^{13}$C). The data were processed using the MestReNova software (v 11.0) and all chemical shifts δ are reported in parts per million (ppm) with coupling constants in Hz (multiplicity: s=singlet, d=doublet, dd=doublet of doublets, t=triplet, dt=doublet of triplets, ddd=doublet of doublets of doublets, sep=septuplet, m=multiplet, br=broad signal).

Mass Analysis

High resolution mass spectrometry was conducted with an ESI-MS Bruker FTMS 4.7 T BioAPEX II instrument equipped with ComiSource 1.0 and operating in positive ionization mode.

Measurement of Static Mechanical Properties

The static mechanical properties were measured with a Zwick/Roell Z010 instrument equipped with 200N and 5N capacity cells, on Dumbell specimens of dimensions 38×5×0.1−0.3 mm (length×width×thickness) prepared by vulcanisation (at 150° C. for 30 min) of the elastomeric compounds to be examined. In the measurement, a preload of 0.01 MPa was applied for 30 seconds and subsequently a constant deformation of 200%/min, where the percentage refers to the length of the sample under examination calculated from the distance between the two clamps.

Dynamic Mechanical Analysis (DMA)

The dynamic modulus was measured with a TA Instruments DMA Q800 equipment set in thin film voltage mode, suitable for measuring rectangular specimens of dimensions 5−15×5.6×0.1−0.5 mm (length×width×thickness).

In the low deformation DMA measurement, the method involved the application of a sinusoidal dynamic deformation of an amplitude equal to ±0.25% with respect to the length under preload of 0.01 MPa, at a frequency of 1 Hz, and at the same time of a ramp of temperature with constant increase of 3° C./min from −80° C. to +170° C.

In the high deformation DMA measurement, to the sample placed under constant temperature of 70° C., and 25% pre-load, where the percentage refers to the length of the sample being examined calculated from the distance between the two clamps, a sinusoidal dynamic deformation with an amplitude equal to ±3.5% with respect to the length under pre-load was applied, at a frequency of 10 Hz, until the equilibrium of the dynamic elastic modulus (E') was reached, typically identifiable after an application of 45 minutes, such as reaching a constant value (less than 0.05% variation in 5 minutes) of E'. Once the dynamic equilibrium of the material was reached, a temperature ramp with a constant increase of 3° C./min from −80° C. to +170° C. was applied.

The dynamic elastic properties were expressed in terms of dynamic elastic modulus (E') and tan delta (loss factor).

Evaluation of Cross-Linking: Swelling Test

The swelling test was carried out by immersing the sample under examination with dimensions equal to 10×5.6×0.3 mm (length×width×thickness) and weight between 22 and 27 mg, in a cyclohexane solution and evaluating the weight variation, at defined intervals (10, 15, 20, 25, 30, 35, 90 minutes), with respect to the dry sample.

In order to evaluate the actual cross-linking given by the coordination complexes, after the initial weighing at defined intervals of the sample soaked in cyclohexane alone, a MeBIP ligand antagonist (in this case the TMEDA ligand) was added to the same solution. The sample under examination was then weighed again at defined intervals of 45, 60, 150 minutes.

Example 1: Preparation and Characterisation of Cross-Linking Agents of Formula (I)

Example 1a: Norb-MeBIP Preparation

The reversible cross-linking agent of formula (I-B)

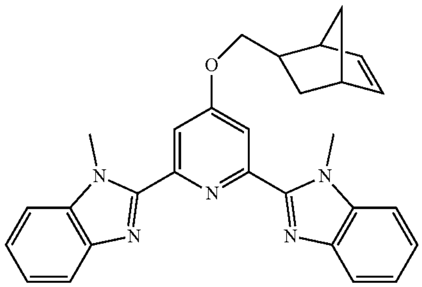

wherein A=norbornene, B=—O—$CH_2$—, C=MeBIP and wherein MeBIP indicates the 2,6-bis(1-methylbenzimidazol-2-yl)-pyridine-4-yl (II-B) group (II-B)

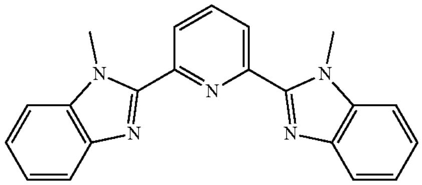

was prepared according to the following synthesis scheme 2:

Scheme 2

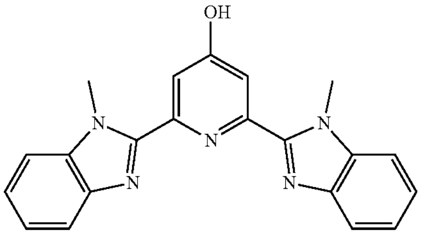

(1)

+

-continued

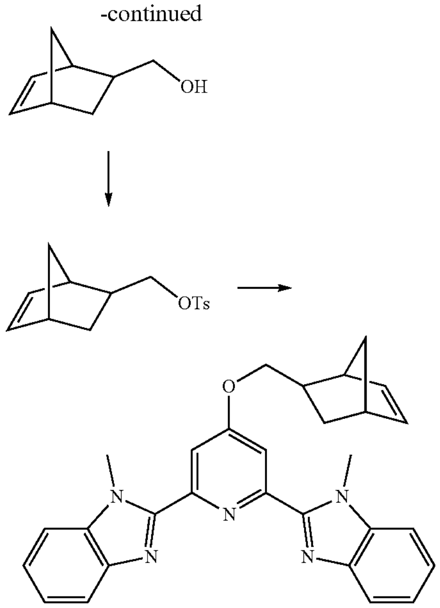

(I-B)

Intermediate (1) was prepared as described below.

5-Norbornene-2-methylthosylate was prepared by reaction between 5-Norbornene-methanol (1 eq), p-Toluensulfonyl chloride (1.2 eq) and triethylamine (1.5 eq) in dichloromethane (1.5 M) at room temperature for 16 hours. When the reaction was complete, the solution was diluted with dichloromethane and extracted with water, then the organic phase was concentrated under vacuum. The residue was purified by means of a chromatographic column using a 9:1 pentane:ethyl-acetate solution as eluent, obtaining the pure product with quantitative yield.

Intermediate (1) (1 eq) was converted to the reversible cross-linking agent (IB) Norb-MeBIP by reaction with 5-Norbornene-2-methyltosylate (1.2 eq) and potassium carbonate (3 eq) under reflux in Acetonitrile (0.3 M) for 16 h. When the reaction was complete, the solution was extracted with water and dichloromethane, then the organic phase was dried under vacuum. The pure product was obtained by vapour diffusion crystallization, placing the container with the concentrated organic solution of the raw product inside a larger container into which diethyl ether was then added. The larger container was then sealed in order to keep the vapours of the two solvents inside the chamber, with a yield of 92%.

Example 1b: Ligand (I-C) HS-MeBIP Preparation

The reversible cross-linking agent of formula (I-C)

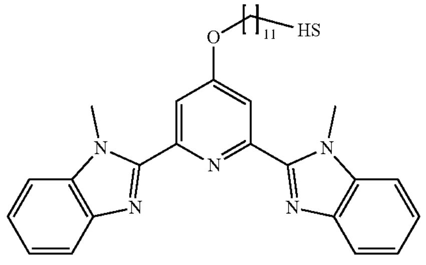

wherein A=HS—, B=—O—$(CH_2—)_{11}$, C=MeBIP, was prepared according to the following synthesis scheme 3:

Scheme 3

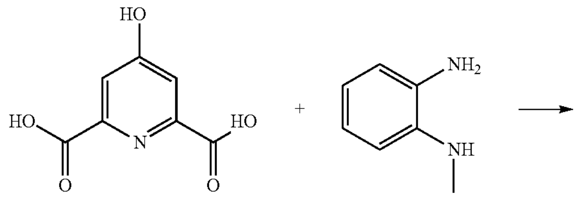

(a)

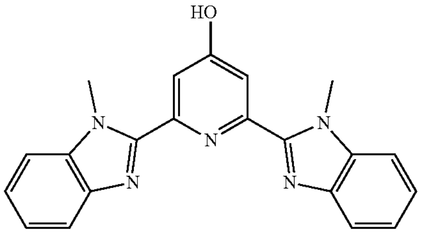

(1)

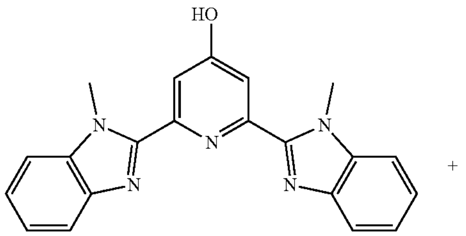

(b)

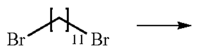

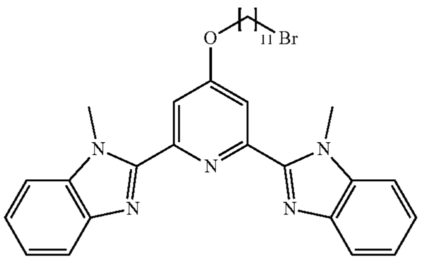

(2)

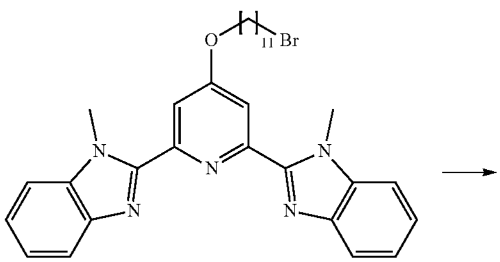

(c)

-continued

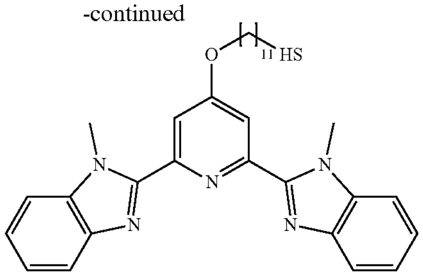

(I-C) (HS-MeBIP)

Intermediate 1 (HO-MeBIP) was prepared following the procedure described by Rowan and Beck [*Metal-legant induced supramolecular polymerization: A route to responsive materials*. Faraday Discussions 128, 43-53, (2005)] (Step a: $H_3PO_4$, 200° C., yield 71%).

Intermediate 1 (1 eq) was then alkylated on the OH group with 1,11-dibromoundecane (1.2 eq) and potassium carbonate (3 eq) under reflux in Acetonitrile (0.3 M) for 16 h. When the reaction was complete, the solution was extracted with water and dichloromethane, then the organic phase was concentrated under vacuum. The pure product was obtained by vapour diffusion crystallization, placing the container with the concentrated organic solution of the raw product inside a larger container into which diethyl ether was then added. The larger container was then sealed in order to keep the vapours of the two solvents inside the chamber, obtaining intermediate 2 with a yield of 87%.

Finally, the derivative thiol (I-C, HS-MeBIP) was prepared directly by reaction of intermediate 2 (1 eq) with hexamethyldisilazane (1.2 eq) and 1M tetrabutylammonium fluoride in THF (1.1 eq at room temperature in anhydrous Tetrahydrofuran (0.5M) for 2 hours. When the reaction was complete, the solution was diluted with dichloromethane and extracted with water, then the organic phase was concentrated under vacuum. The pure product was obtained by vapour diffusion crystallization, placing the container with the concentrated organic solution of the raw product inside a larger container into which diethyl ether was then added. The larger container was then sealed in order to keep the vapours of the two solvents inside the chamber, with a quantitative yield.

The chemical structure of the reversible cross-linking agent (I-C) HS-MeBIP was confirmed by NMR spectroscopy and mass spectrometry:

1H-NMR (400 MHZ, $CD_2Cl_2$, RT): δ=1.32 (m, 14H) 1.60 (m, 2H) 1.89 (m, 2H) 2.51 (dd, 2H) 4.26 (s, 6H) 4.27 (m, 2H) 7.34 (m, 2H) 7.39 (m, 2H) 7.50 (d, J=7.54 Hz, 2H) 7.81 (d, J=7.44 Hz, 2H) 7.98 (s, 2H); 13C NMR (400 MHZ, CD2CI2, RT): δ=167.23, 151.57, 150.77, 142.66, 137.81, 124.07, 123.31, 120.26, 112.45, 110.67, 69.52, 34.72, 33.18, 30.10, 30.08, 30.06, 29.87, 29.65, 29.49, 28.95, 26.45, 25.12; ESI-MS (pos.) M/z: calculated 542.3 exact 542.29106.

Figure 2:
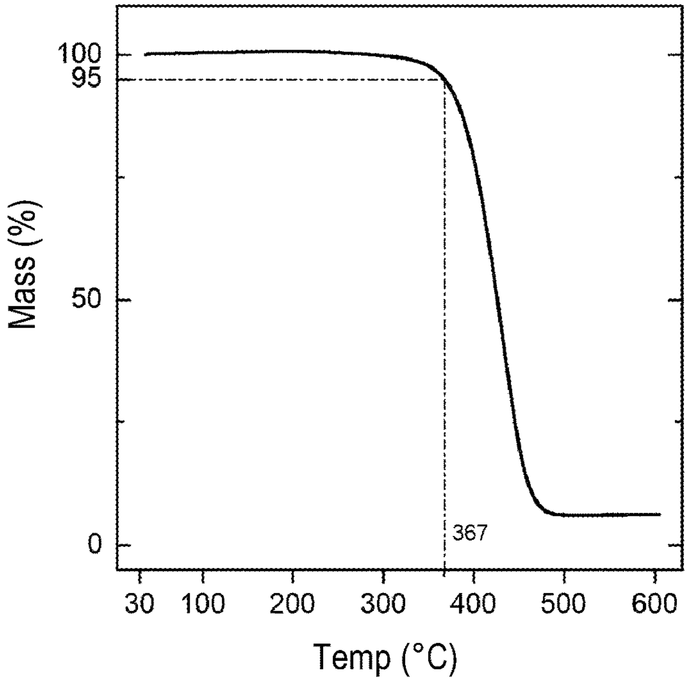
FIGS. 2*a* and 2*b* show the thermal tests (TGA and DSC, respectively) carried out on a sample of the reversible cross-linking agent HS-MeBIP (I-C) (+Q heating, −Q cooling)
Figure 2:
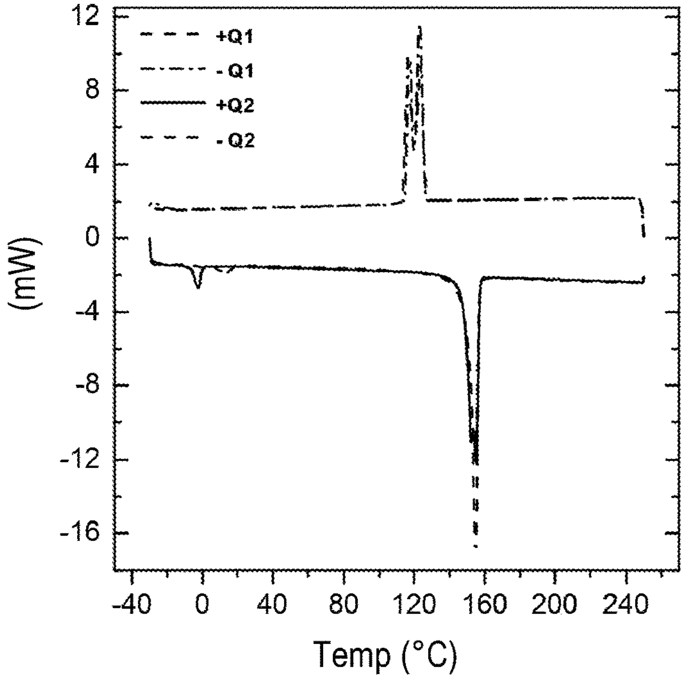

Thermal properties were evaluated by thermogravimetric analysis (TGA, FIG. 2*a*) and differential scanning calorimetric (DSC, FIG. 2*b*).

The reversible cross-linking agent HS-MeBIP (I-C) exhibited high thermal stability, with the onset of mass loss observed in TGA around 367° C. (FIG. 2*a*). The DSC traces showed a reversible melt transition around 150° C. and crystallisation at around 120° C. (FIG. 2*b*).

Example 2: Complexation Studies

The formation of complexes was studied by spectrophotometric titration with increasing metal/ligand (M/L) ratio.

For greater operational simplicity in Examples 2a-2e the intermediate 2 was used as a ligand while in Example 2f, the corresponding reversible cross-linking agent of formula (I) was used.

Figure 3:
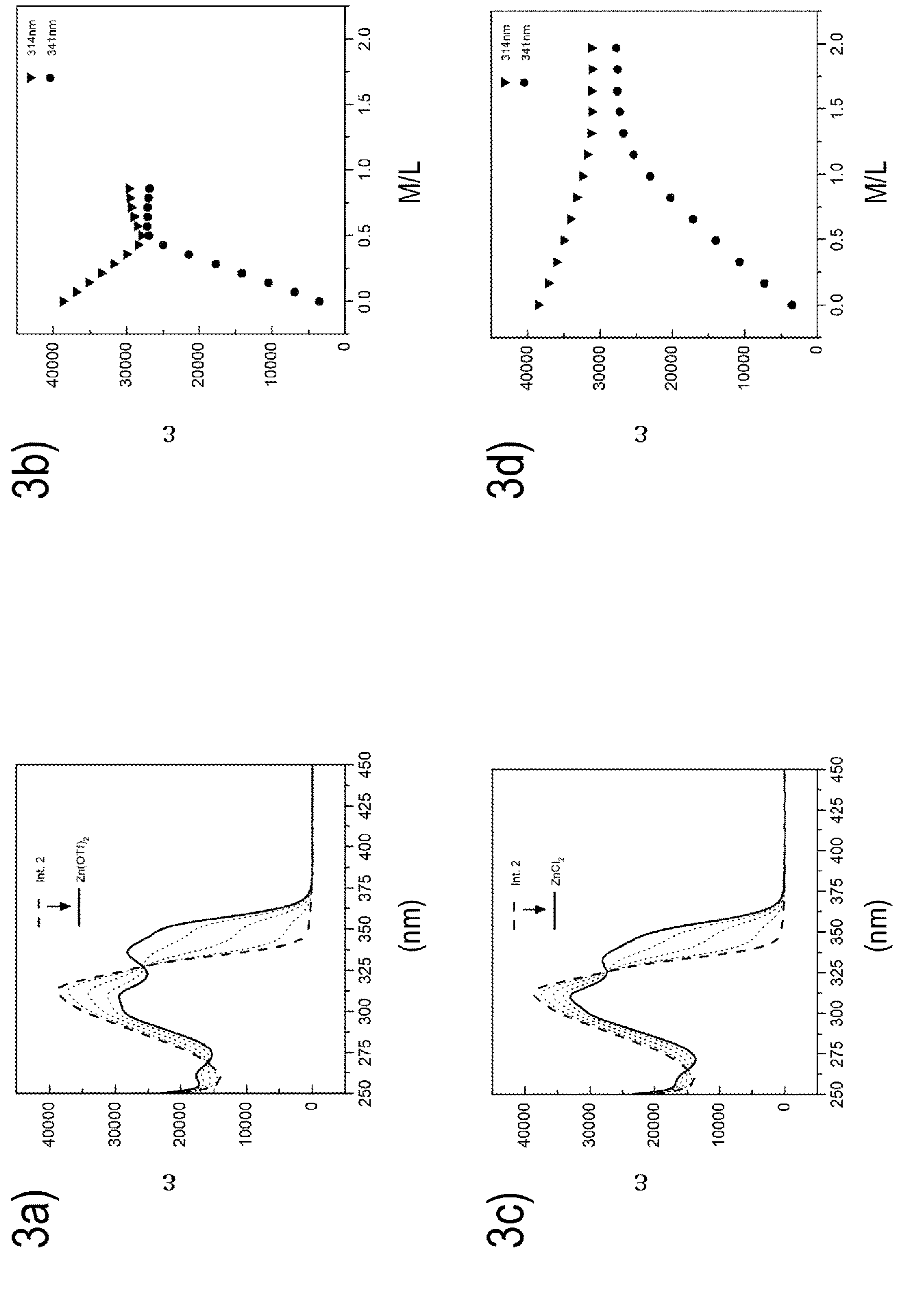
FIGS. 3*a* and 3*b* show the UV absorption pattern during complexation studies of samples of the intermediate ligand 2 with triflate zinc, in particular the UV absorption pattern from 250 nm to 450 nm (FIG. 3*a*) and the UV absorption pattern at 314 nm and 341 nm, wavelengths characteristic of the absorption of the ligand and its complex, respectively, as the metal/ligand ratio (M/L) varies (FIG. 3*b*)
FIGS. 3*c* and 3*d* show the UV absorption pattern during complexation studies of samples of the intermediate ligand 2 with zinc chloride.
FIGS. 3*e* and 3*f* show the UV absorption pattern during complexation studies of samples of the intermediate ligand 2 with zinc 2-ethylhexanoate.
FIGS. 3*g* and 3*h* show the UV absorption pattern during complexation studies of samples of the intermediate ligand 2 with terbium triflate.
FIGS. 3*i* and 3*l* show the UV absorption pattern during complexation studies of samples of the ligand HS-MeBIP (I-C) with zinc bistriflimide $[Zn(CF_3SO_2N)_2]$.
Figure 3:
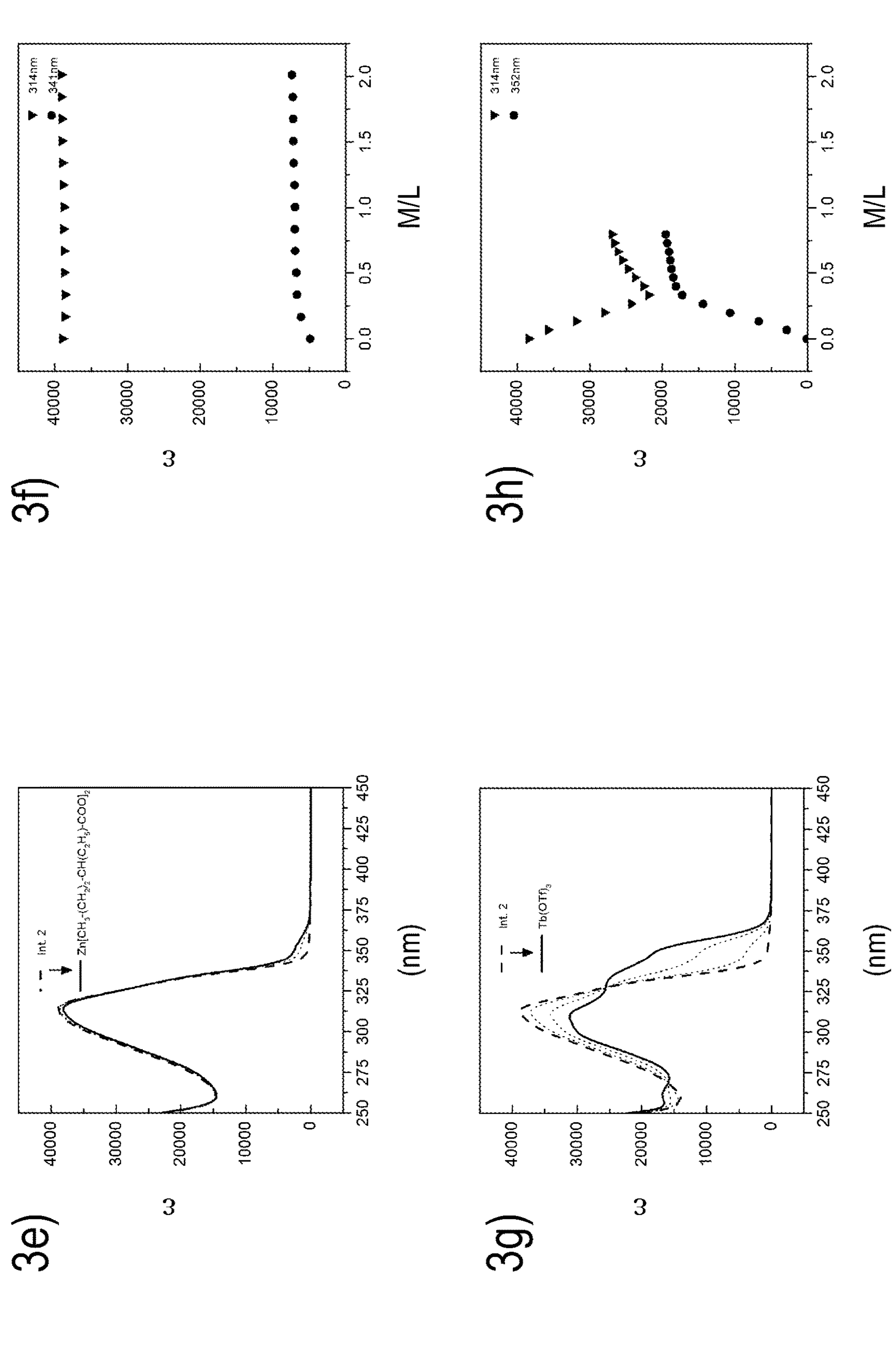
Figure 3:
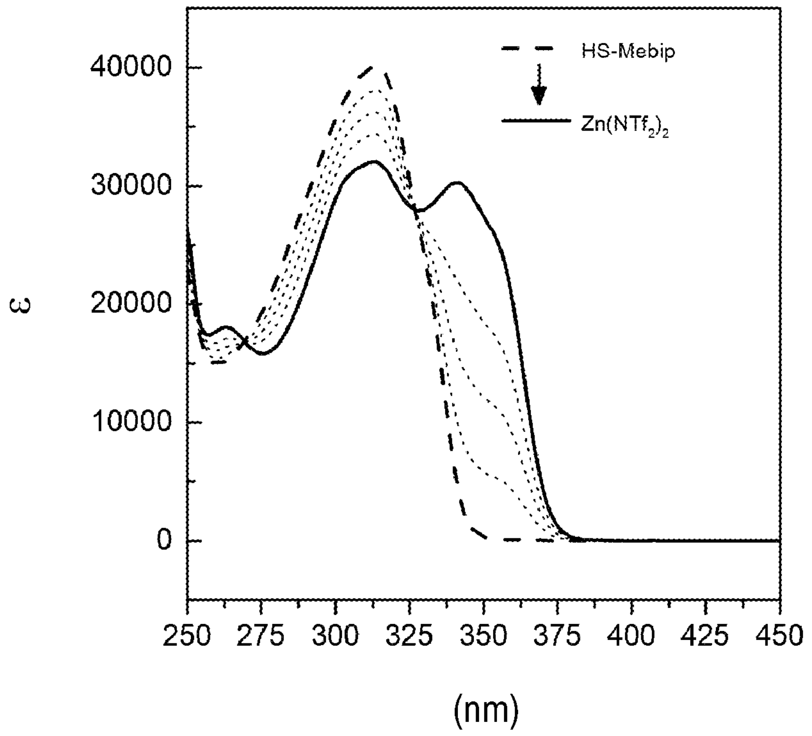
Figure 3:
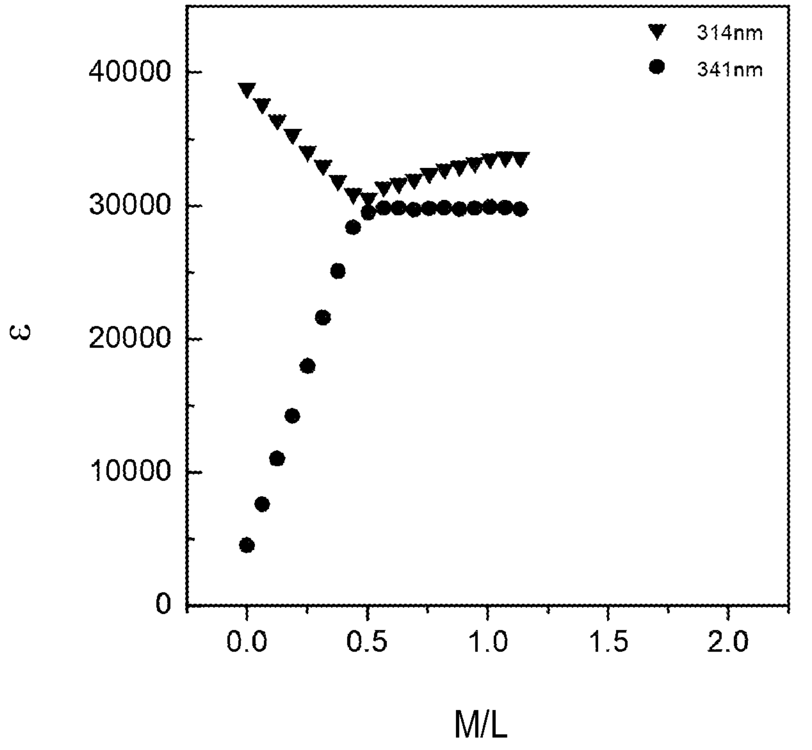

Example 2a: adding aliquots (25 µl) of a solution of $Zn(OTf)_2$ in ACN(c=125 µmol/l) to a solution of intermediate 2 in ACN (c=22 µmol/l) showed that the maximum absorption shifted from the wavelength of 314 nm, characteristic of the ligand (L), to 341 nm, the absorption band of the corresponding metal-ligand complex (ML) (FIG. 3*a*).

The graph of the absorption intensity at these wavelengths versus the metal/ligand ratio confirmed that the complex formation was complete after the addition of 0.5 equivalents of $Zn^{2+}$ (FIG. 3*b*), corroborating the thesis of the formation of the desired complex with a metal/ligand ratio of 1:2 and showing that the triflate anion was a weaker coordinating anion than the ligand 2,6-Bis(1-methylbenzimidazol-2-yl)-pyridine-4-yl of Intermediate 2.

Example 2b: the addition of aliquots (50 µl) of a solution of $ZnCl_2$ in ACN (c=143.5 µmol/l) to a solution of intermediate 2 in ACN (c=22 µmol/l) showed, as for the example shown in FIG. 3*a*, that the maximum absorption shifted from the wavelength of 314 nm, characteristic of the ligand (L), to 341 nm, absorption band of the corresponding metal-ligand complex (ML) (FIG. 3*c*). The graph of the absorption intensity at these wavelengths versus the metal/ligand ratio showed that the complex formation was complete after the addition of 1 equivalent of $Zn^{2+}$ (FIG. 3*d*), demonstrating that the use of a salt with a strongly coordinating anion penalised the formation of the desired 1:2 complex and instead led to the formation of a 1:1 complex, unsuitable for the purpose of the present invention.

Example 2c: the addition of aliquots (50 µl) of a solution of Zn 2-ethylhexanoate in $CHCl_3$/ACN (9:1) (c=144 µmol/l) to a solution of intermediate 2 in $CHCl_3$/ACN (9:1) (c=21.5 µmol/l) showed, contrary to the previous examples shown in FIGS. 3*a* and 3*c*, that the characteristic absorption of the ligand (L), at 341 nm, did not show shifting after numerous additions of metal (FIG. 3*e*). The graph of the absorption intensity at these wavelengths versus the metal/ligand ratio showed that the complex formation was not completed although additions were made until 7 equivalents of $Zn^{2+}$ were reached (FIG. 3*f*), demonstrating that the use of a salt with a strongly coordinating anion penalised the formation of the complex itself.

Example 2d: Repeating Example 2c with zinc stearate, the same strongly coordinating anion behaviour was observed (no complex formation of zinc with intermediate 2).

Example 2e: adding aliquots (25 µl) of a solution of $Tb(OTf)_3$ in ACN (c=114.5 µmol/l) to a solution of intermediate 2 in ACN (c=21.5 µmol/l) showed that the maximum absorption shifted from the wavelength of 314 nm, characteristic of the ligand (L), to 341 nm, the absorption band of the corresponding metal-ligand complex (ML) (FIG. 3*g*). The graph of the absorption intensity at these wavelengths versus the metal/ligand ratio confirmed that the complex formation was complete after the addition of 0.33 equivalents of $Tb^{3+}$ (FIG. 3*h*), corroborating the thesis of the formation of the desired complex, having a metal/ligand ratio of 1:3 typical in the case of using salts of trivalent metal ions with weakly coordinating anions.

Example 2f: the addition of aliquots (25 µl) of a solution of $Zn(NTf_2)_2$ (zinc bistriflimide) in $CHCl_3$/ACN (9:1) (c=111.3 µmol/l) to a solution of reversible cross-linking agent HS-MeBIP (I-C) in $CHCl_3$/ACN (9:1) (c=25 µmol/l) showed that the maximum absorption shifted from the wavelength of 314 nm, characteristic of the ligand (L), to 341 nm, the absorption band of the corresponding metal-ligand complex (ML) (FIG. 3*i*). The graph of the absorption intensity at these wavelengths versus the metal/ligand ratio confirmed that the complex formation was complete after the addition of 0.5 equivalents of $Zn^{2+}$ (FIG. 3*l*), corroborating the thesis of formation of complexes with a metal/ligand ratio of 1:2. The experiment showed that the presence of the $(CF_3SO_2)_2N^-$ group, a weakly coordinating anion, did not interfere in any way with the complexation.

The conditions and results of the complexation tests of Examples 2a-2f are summarised in the following Table 1:

TABLE 1

| Ex. | Metal (M) | Salt anion | Cross-linker/ Ligand (L) | Complex (ML) | M/L | Anion complexing force |
|---|---|---|---|---|---|---|
| 2a | $Zn^{2+}$ | triflate | Int. 2 (MeBIP) | $Zn(MeBIP)_2$ | 2:1 | Weak |
| 2b | $Zn^{2+}$ | chloride | Int. 2 (MeBIP) | Zn(MeBIP)Cl | 1:1 | Strong |
| 2c | $Zn^{2+}$ | 2-ethyl hexanoate | Int. 2 (MeBIP) | no | no | Very strong |
| 2d | $Zn^{2+}$ | stearate | Int. 2 (MeBIP) | no | no | Very strong |
| 2e | $Tb^{3+}$ | triflate | Int. 2 (MeBIP) | $Tb(MeBIP)_3$ | 3:1 | Weak |
| 2f | $Zn^{2+}$ | bistriflimidate | HS-MeBIP | $Zn(MeBIP)_2$ | 2:1 | Weak |

where triflate is the anion $CF_3SO_3^-$ and bistriflimidate is the anion $(CF_3SO_2)_2N^-$. For the purposes of the invention, it is important that complexes may be formed in which at least two ligands coordinate to a metal centre.

Example 3: Preparation of the Zn— Complex $(HS\text{-}MeBIP)_2$

The complex between HS-MeBIP (I-C) and $Zn^{2+}$, i.e. the $Zn(HS\text{-}MeBIP)_2$ complex represented herein

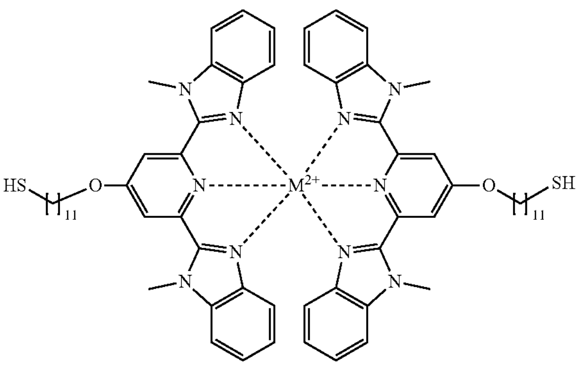

where $M^{2+}$ is $Zn^{2+}$, was obtained on a preparative scale of 500 mg as a pale pink solid by adding 0.5 eq of $Zn(OTf)_2$ dissolved in methanol to a solution of the HS-MeBIP ligand dissolved in chloroform/methanol 9:1 at room temperature and subsequent evaporation of the solvent at 60° C. under vacuum ($10^{-4}$ mbar) for 16 hours.

The chemical structure of the complex was confirmed by NMR spectroscopy: 1H-NMR (400 MHZ, $CD_2Cl_2$, RT): δ=1.32 (m, 12H) 1.62 (m, 2H) 1.70 (m, 2H) 2.11 (m, 2H) 2.51 (dd, 2H) 4.34 (s, 6H) 4.65 (m, 2H) 6.54 (d, J=8.15 Hz, 2H) 7.12 (m, 2H) 7.31 (m, 2H) 7.44 (d, J=8.32 Hz, 2H) 8.10 (s, 2H).

Example 4

Preparation of Elastomeric Compounds

Reference elastomeric compounds and according to the invention were prepared, with the compositions reported in the following Table 2:

TABLE 2 elastomeric compositions (phr)

| Step | Compositions Ingredients | 1 Ref. | 2 Inv. | 3 Inv. |
|---|---|---|---|---|
| 1 | SBR 4602 | 100 | 100 | 100 |
| | 6PPD | 1 | 1 | 1 |
| | Stearic ac. | 2 | 2 | 2 |
| | ZnO | 2 | 2 | 2 |
| | Carbon black | 40 | 40 | 40 |
| | Reversible cross-linking agent | — | HS-MeBIP (I-C) 6.92 | Norb-MeBIP (I-B) 5.90 |
| 2 | Sulphur | 1 | 1 | 1 |
| | CBS | 2.5 | 2.5 | 2.5 |
| | TiBTD | 0.4 | 0.4 | 0.4 |
| | Triflate zinc | — | 2.32 | 2.32 |

Key: Ref. = Standard reference compound; Inv. = Compound according to the invention; SBR 4602: styrene-butadiene elastomeric polymer (Mn: 300,000 Da) supplied by Trinseo; 6PPD: N-(1,3-dimethylbutyl)-N'-phenyl-p-phenylenediamine supplied by Eastman Chemical Company; Stearic acid: supplied by SOGIS INDUSTRIA CHIMICA S.p.A, sulphur activator; ZnO: supplied by Empils-Zinc, sulphur activator; Carbon black: Vulcan ® 1391 supplied by Cabot Corporation, reinforcing filler; Cross-linking agents: HS-MeBIP (I-C) and Norb-MeBIP (I-B) prepared as described in Example 1b-1a; Sulphur: supplied by Zolfindustria vulcaniser; CBS: N-Cyclohexylbenzothiazol-2-sulphenamide, supplied by General Quimica SA accelerant; TiBTD: Diisobutyl-Thiuram-Disulphide, supplied by PUYANG WILLING CHEMICALS CO., LTD accelerant; Zinc triflate: supplied by Strem Chemicals, metal cation salt.

Starting from the elastomeric compositions 1-3 shown in Table 2, the corresponding elastomeric compounds were prepared according to the following process.

The mixing of the components was carried out in two steps using a Brabender Plastograph EC rheometer apparatus equipped with the Measuring Mixer 30 EHT mixing system with a total capacity of 30 ml.

In the first step (1), the SBR 4602, the 6PPD, the Stearic acid, ZnO, the reversible cross-linking agent and carbon black were introduced. Mixing at 60 rpm was continued for 5 minutes, at 130° C.

Subsequently, in the second step (2), carried out using the same mixer, sulphur, CBS, TiBTD and triflate zinc were added, and mixing at 60 rpm was continued for about 4 minutes at 70° C., when the vulcanisable compounds were discharged and vulcanised in a press at 150° C. for 30 min.

Characterisation of the Compounds

Static Mechanical Properties

The main static properties of the vulcanised elastomeric compounds 1-3, measured with the methods described above, are shown in the following Table 3:

TABLE 3 static properties of compounds 1-3

| Compositions | 1 Ref. | 2 Inv. | 3 Inv. |
|---|---|---|---|
| Reversible cross-linking agent | — | HS-MeBIP (1 mol %) | Norb-MeBIP (1 mol %) |
| Salt | | $Zn(OTf)_2$ | $Zn(OTf)_2$ |
| E (MPa) | 12.2 ± 0.7 | 19.9 ± 1.3 | 15.8 ± 0.6 |
| CR (MPa) | 20.7 ± 2.6 | 22.1 ± 1.7 | 20.3 ± 0.9 |
| CA05 (MPa) | 1.72 ± 0.03 | 2.04 ± 0.02 | 1.85 ± 0.03 |
| CA1 (MPa) | 2.99 ± 0.08 | 3.25 ± 0.03 | 2.88 ± 0.04 |
| AR (%) | 392 ± 39 | 476 ± 26 | 457 ± 13 |

where E is Young's modulus, i.e. the modulus representing the resistance of the material to elastic deformation, calculated as the secant modulus in the deformation from 0 to 2%, CR is the load at break, CA05 and CA1 is the load for an elongation of 50% and 100% respectively, AR is the elongation at break.

As may be seen from the data reported in Table 3, the compounds 2 and 3 comprising the cross-linking system according to the invention show a Young's modulus E, a load at 50% elongation and above all an elongation at break higher than the reference compound, indicating on the one hand an increased level of overall cross-linking, keeping the other features comparable and on the other of an improvement in the balance between modulus and fragility: the extra cross-linking introduced does not in fact lead to a decrease in the elongation at break, as it usually occurs, but is even accompanied by an increase in it.

In the case of compound 3, the increase in the modulus value lower than that measured for compound 2 could be attributable to the fact that presumably, part of the sulphur destined for vulcanisation was consumed by the norbornene group, resulting overall in a "base" cross-linking, i.e. net of the reversible cross-linking agent of the invention, lower than the reference.

Dynamic Mechanical Properties

The dynamic mechanical properties of compounds 1-3 were measured in terms of dynamic elastic modulus (E') and Tan delta (loss factor), in the conditions of low and high deformation described above.

Figure 4:
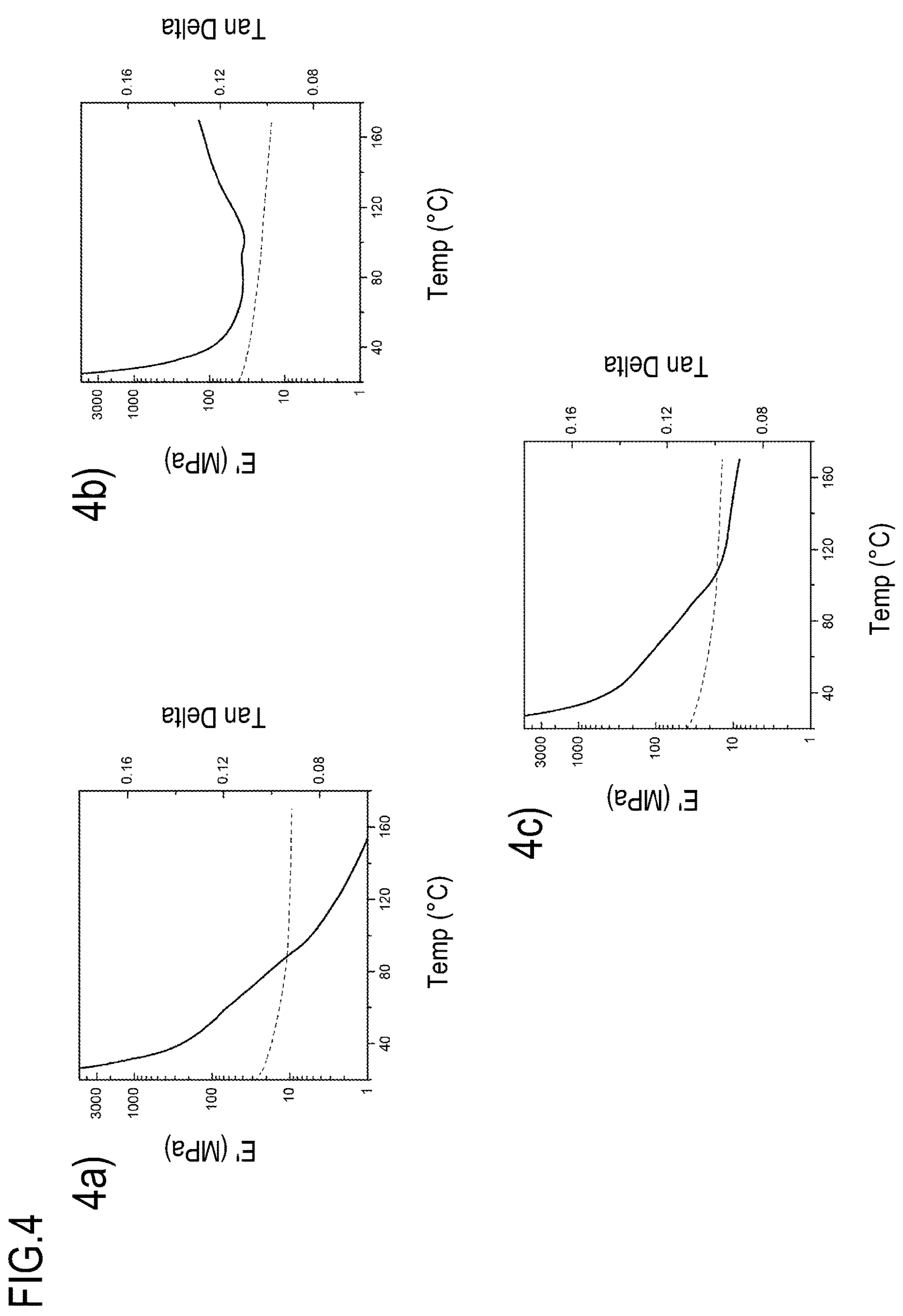
FIGS. 4*a*-4*c* show the module E' pattern (dashed line) and of the Tan delta (solid line) in the temperature range from 20° C. to 170° C. of the vulcanised samples of compounds 1-3 respectively, measured in conditions of low deformation.
Figure 5:
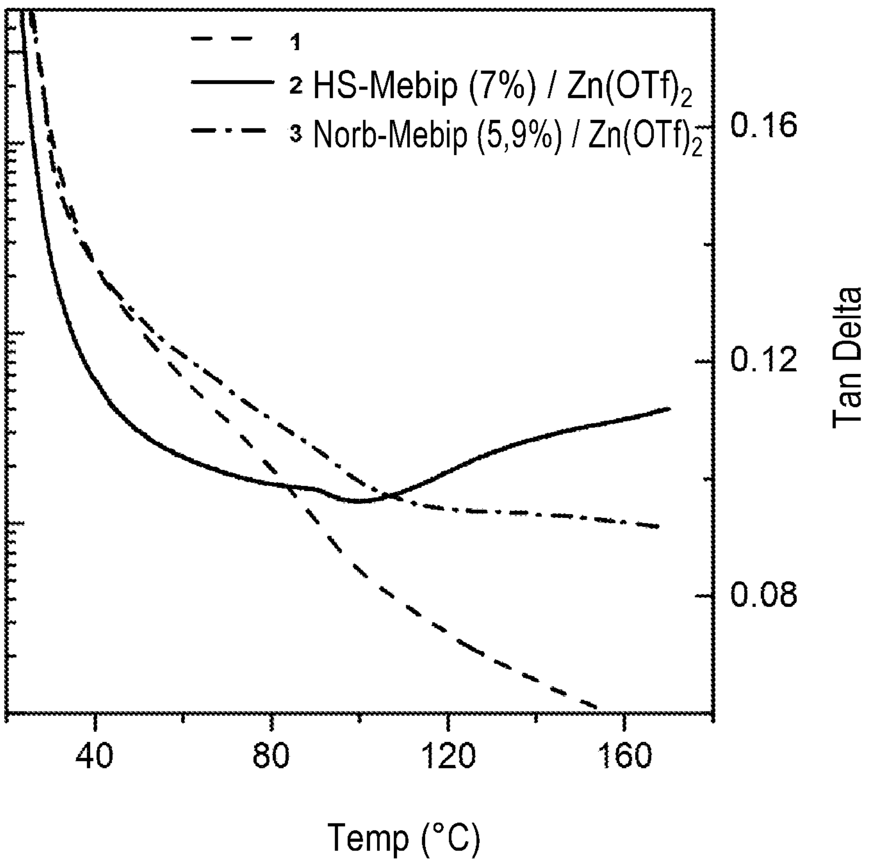
FIG. 5 shows the Tan delta pattern in the temperature range from 20° C. to 170° C. of the vulcanised samples of compounds 1-3, respectively, measured in conditions of low deformation.
Figure 6:
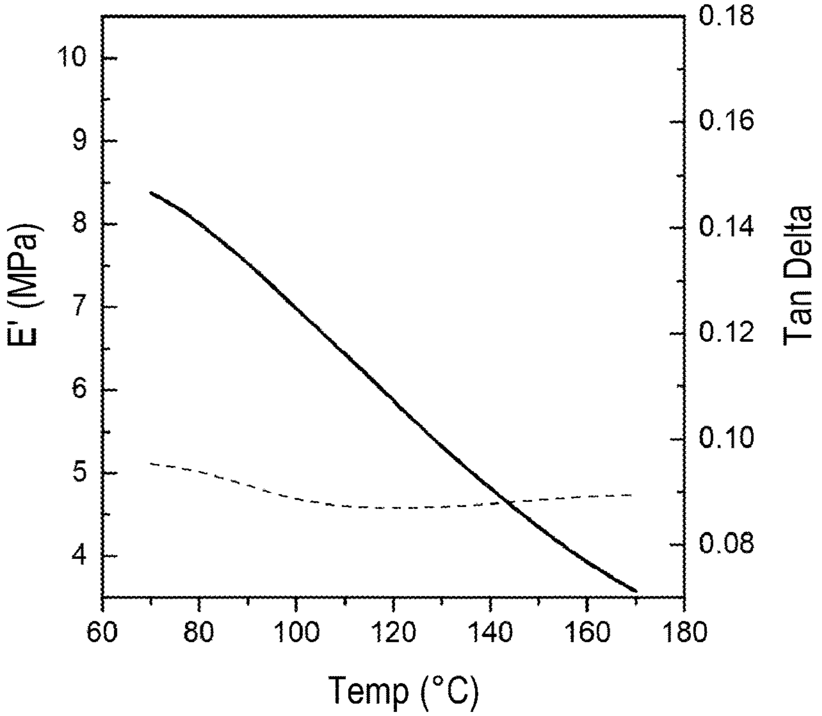
FIGS. 6*a*-6*b* respectively show the module E' pattern (dashed line) and of the Tan delta (solid line) in the temperature range from 70° C. to 170° C. of the vulcanised samples of compounds 1-2, respectively, measured under conditions of high deformation.
Figure 6:
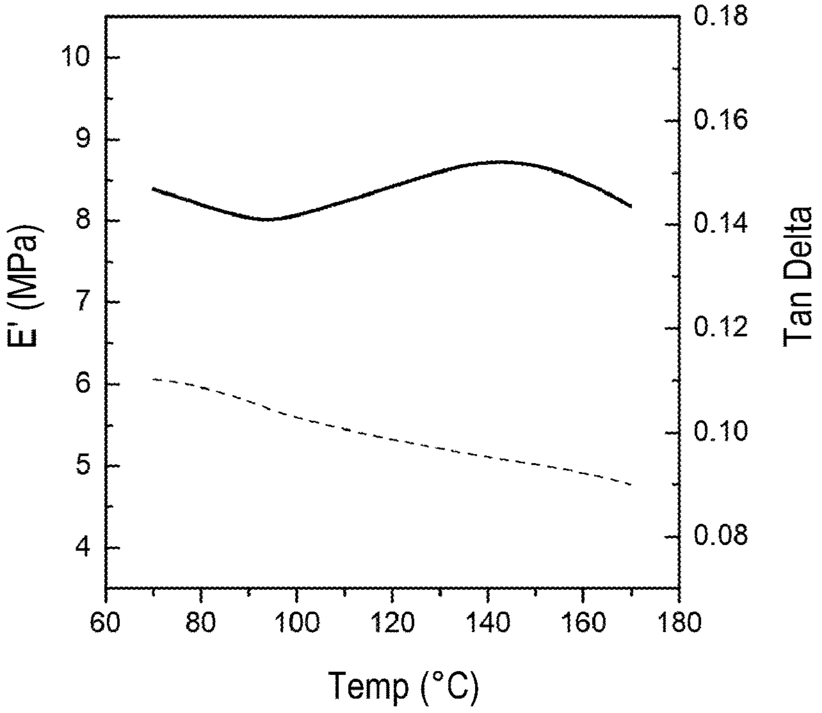

The pattern of the modulus E' and of the Tan delta in the temperature range from 20° C. to 170° C. of the vulcanised samples is shown in FIGS. 4-6.

From the graph of FIG. 4*a* it may be observed that the Tan delta (solid line) of the reference compound 1 has a decreasing monotone pattern as the T increases, as expected for conventional elastomeric compounds cross-linked above the Tg. This pattern is associated in the tyre with phenomena of wear, tear resistance and road grip in sports driving which are not completely satisfactory.

Instead, the graph of FIG. 4*b* shows that in the case of compound 2 according to the invention, by virtue of the reversible cross-linking of the compound given by the formation of coordinative bonds with zinc, the Tan delta value increases with increasing temperature. This pattern is particularly desirable as it predicts rolling resistance fully comparable to the reference compound at temperatures around 50° C.-70° C. under normal driving conditions but of superior road grip in sport driving conditions, predictable for the greater hysteresis at higher temperatures.

The graph of FIG. 4*c* shows that even in the case of the compound 3 according to the invention, the Tan delta value does not have a monotone decreasing pattern as the T increases as for the reference compound (FIG. 4*a*) but remains almost constant, suggesting properties similar to those described above for compound 2. From the superimposed graphs shown in FIG. 5 it is possible to better appreciate the characteristic Tan delta pattern of the compounds according to the invention (2 and 3) with respect to that of the reference compound 1 (without reversible cross-linking agent).

From the comparison of the graphs shown in FIGS. 6*a*-6*b*, relating to samples of reference compound 1 and of the invention 2, the same Tan delta pattern is noted for the compound of the invention as the temperature increases, even with a high deformation measurement procedure, indicative of the triggering of the dissipative mechanism (complexation-decomplexing) in conditions of high temperature and deformation typical of extreme driving, which even leads to double the hysteresis level compared to the reference compound at 170° C., while maintaining for the entire temperature range comparable dynamic modulus values, predictive of an almost constant tread footprint and deformability.

Reversibility of Cross-Linking (Swelling Test)

This test studied the reversibility of the cross-linking of the vulcanised compounds 1-3 through a swelling experiment in solvent.

Figure 7:
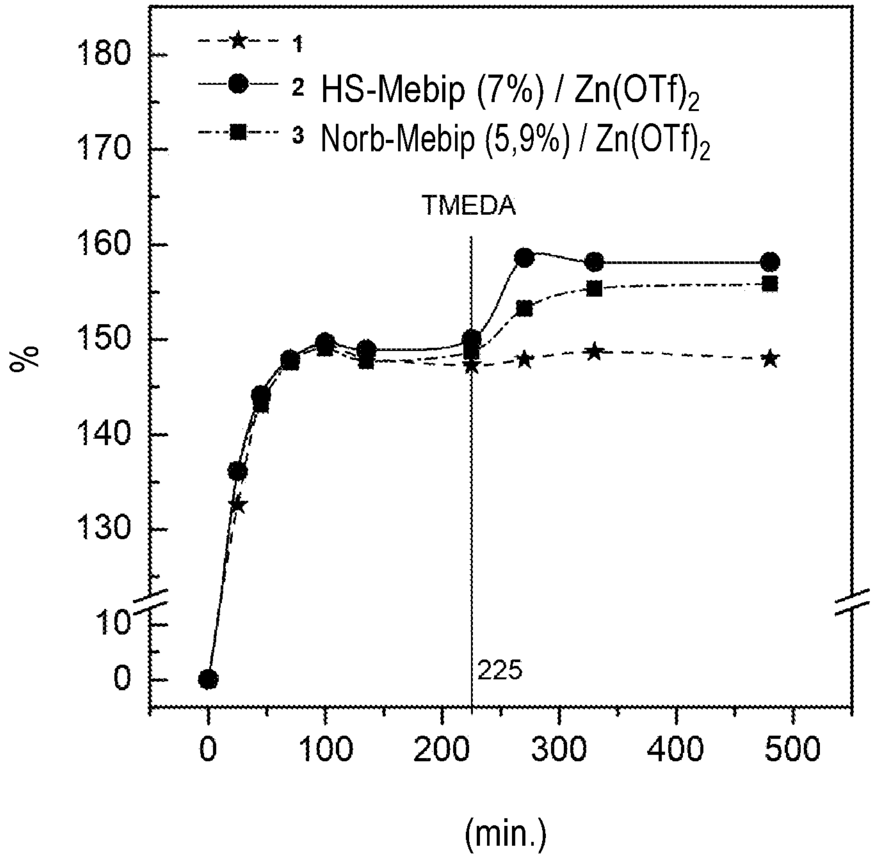
FIG. 7 shows the percentage pattern (by weight) of the cyclohexane swelling of compounds 1-3, before and after the addition of tetramethylethylenediamine TMEDA at 225 min.

It is known that the equilibrium swelling of a vulcanised compound in a given solvent depends, at constant temperature and pressure, on the lattice density of the compound itself. To demonstrate the hypothesis that inter- and/or intra-molecular bonds due to the cross-linking agents according to the invention are present in the compounds according to the invention, a two-step experiment was carried out: first an equilibrium condition was reached in which the bonds due to the cross-linking agents of the invention were also formed, then a competitive ligand capable of selectively destroying those bonds was added. The increased swelling of the materials after addition proved the correctness of the hypothesis. As shown in FIG. 7, an increase in the swelling value was observed for compounds 2 and 3 (invention) after the addition of tetramethylethylenediamine (TMEDA), competitive binder vs MeBIP, thus demonstrating the reversibility of the cross-linking by complexation: in fact, as shown by the data reported in Table 4 from the addition of the competitive ligand, the swelling increased (increase in weight of the sample of 9.2% and 6.0%) due to the decrease in the extent of cross-linking:

TABLE 4

| swelling of compounds (% weight vs initial weight) | | | |
|---|---|---|---|
| Compositions | 1 Ref. | 2 Inv. | 3 Inv. |
| Reversible cross-linking agent | — | HS-MeBIP (1 mol %) | Norb-MeBIP (1 mol %) |
| Salt | | $Zn(OTf)_2$ | $Zn(OTf)_2$ |
| Equilibrium | 147.5% | 149.1% | 148.6% |
| TMEDA added | | | |
| Equilibrium | 148.1% | 158.3% | 154.6% |
| Difference after adding TMEDA | +0.6% | +9.2% | +6.0% |

The counter-proof of the reversible complexation mechanism for the compounds of the invention 2 and 3 was given by the fact that the addition of TMEDA to the reference compound 1, where cross-linking by complexation was not possible, did not produce any increase in the swelling value (FIG. 7), confirming the absence of reversible bonds.

The invention claimed is:

1. An elastomeric composition for tyre compounds comprising:

100 phr of at least one diene elastomeric polymer, at least 0.1 phr of at least one reversible cross-linking agent of formula (I):

A-B-C (I)

wherein

A is at least one functional group capable of covalently binding to the elastomeric polymer, B, optionally present, is an at least divalent inert organic residue covalently bonded to A and C groups, C is at least one multidentate organic ligand capable of reversibly complexing at least one metal cation, at least 0.1 phr of at least one salt of the metal cation, wherein the salt comprises an anion and the anion is a weakly coordinating anion, at least 0.1 phr of at least one reinforcing filler, and at least 0.1 phr of the at least one vulcanising agent.

2. The composition according to claim 1, wherein in the reversible cross-linking agent of formula (I), only one A group is present, only one C ligand is present, and the B residue is present and is divalent.

3. The composition according to claim 1, wherein in the reversible cross-linking agent of formula (I), A is chosen from activated double bonds, sulphur groups, phenols, 1,3-dipole precursors, substituted pyrroles, and dienes capable of giving Diels-Alder reactions.

4. The composition according to claim 3, wherein in the reversible cross-linking agent of formula (I), A is chosen from norbornyl, methacryl, vinylether and mercapto groups.

5. The composition according to claim 1, wherein, in the reversible cross-linking agent of formula (I), B is present and is chosen from alkylene $C_1$-$C_{20}$, arylene $C_6$-$C_{20}$, alkylene-$C_1$-$C_{10}$-arylene-$C_6$-$C_{10}$, arylene-$C_6$-$C_{10}$-alkylene-$C_1$-$C_{10}$.

6. The composition according to claim 5 wherein B includes in the chain one or more heteroatoms or one or more functional groups chosen from —COO—, —OCO—, —CONH—, —NHCO—, —OCONH—, —NHCONH—, —CO—, —NH—C(NH)—NH—, —C(S)—S—, —S—C(S)—.

7. The composition according to claim 1, wherein in the reversible cross-linking agent of formula (I), B is present and has a molecular weight of less than 4000 g/mol.

8. The composition according to claim 7, wherein in the reversible cross-linking agent of formula (I), B has a molecular weight of less than 1000 g/mol.

9. The composition according to claim 1, wherein, in the reversible cross-linking agent of formula (I), the multidentate organic C ligand comprises at least one mono- or polycyclic, 5- or 6-terms ring, saturated, unsaturated or aromatic, and optionally benzocondensate heterocycle, comprising at least one heteroatom chosen from N, P, S and O.

10. The composition according to claim 9, wherein the multidentate organic C ligand comprises at least one substituted or unsubstituted, and optionally benzocondensate nitrogen heterocycle chosen from pyridine, bipyridine, terpyridine, pyrazine, pyrimidine, pyridazine, imidazole, pyrrole, pyrazole, indole, 1,10-phenanthroline, quinoline, isoquinoline, triazole, tetrazole, triazine, and tetrazine.

11. The composition according to claim 1, wherein in the reversible cross-linking agent of formula (I): —only one A group is present, only one C ligand is present, and the B residue is present and is divalent;

the reversible cross-linking agent of formula (I), A is chosen from activated double bonds, sulphur groups, phenols, 1,3-dipole precursors, substituted pyrroles, and dienes capable of giving Diels-Alder reactions, norbornyl, methacryl, vinylether and mercapto groups;

B is present and is chosen from alkylene $C_1$-$C_{20}$, arylene $C_6$-$C_{20}$, alkylene-$C_1$-$C_{10}$-arylene-$C_6$-$C_{10}$, arylene-$C_6$-$C_{10}$-alkylene-$C_1$-$C_{10}$; and the multidentate organic C ligand comprises at least one mono- or polycyclic, 5- or 6-terms ring, saturated, unsaturated or aromatic, and optionally benzocondensate, heterocycle, comprising at least one heteroatom chosen from N, P, S and O.

12. The composition according to claim 1, wherein, in the reversible cross-linking agent of formula (I), A is SH or norbornyl, B is $—O—(CH_2)_{1-11}—$, and C is 2,6-bis(1-methylbenzimidazol-2-yl)-pyridin-4-yl.

13. The composition according to claim 1, wherein the metal cation is selected from the group consisting of alkaline earth metals (2A group), transition metals, and lanthanides.

14. The composition according to claim 1, wherein the weakly coordinating anion is selected from the group consisting of a tosylate, a bistriflimidate, a borate and a triflate.

15. The composition according to claim 1, wherein the salt is zinc triflate.

16. The composition according to claim 1, wherein the at least one reversible cross-linking agent of formula (I) is present in an amount ranging from 0.5 phr to 20 phr.

17. The composition according to claim 1, wherein the at least one salt of the metal cation is present in an amount ranging from 0.2 phr to 7 phr.

18. The composition according to claim 1, wherein the molar ratio of reversible cross-linking agent (I) to the salt of the metal cation ranges from 6:1 to 0.5:1.

19. The composition according to claim 1, wherein the at least one reinforcing filler is present in an amount ranging from 1 phr to 150 phr and is chosen from carbon black, white fillers, silicate fibres, derivatives thereof and mixtures thereof; and the at least one vulcanising agent is present in an amount from 0.1 phr to 10 phr and is chosen from sulphur, sulphur agents, peroxides, and mixtures thereof.

20. A vulcanised elastomeric tyre compound obtained by mixing and vulcanising the elastomeric composition according to claim 1.

21. A process for preparing the vulcanised elastomeric compound according to claim 20, comprising a first non-productive step and a second productive step, comprising in the first non-productive step, mixing at least one dienic elastomeric polymer, at least one reinforcing filler, and optionally, in whole or in part, at least one reversible cross-linking agent of formula (I) and at least one salt of the metal cation, wherein the salt comprises an anion and the anion is a weakly coordinating anion selected from the group consisting of a tosylate, a bistriflimidate, a borate, and a triflate, to produce a first elastomeric compound, in the second productive step, adding to the first elastomeric compound at least one vulcanising agent and optionally, in whole or in part, the at least one reversible cross-linking agent of formula (I) and the at least one salt of the metal cation, and mixing the components, to produce a vulcanisable elastomeric compound, provided that the at least one reversible cross-linking agent of formula (I) and the at least one salt of the metal cation are added in at least one of the two steps, and vulcanising the vulcanisable elastomeric compound, to produce the vulcanised elastomeric compound.

22. The process according to claim 21, wherein the reversible cross-linking agent of formula (I) is added in the first non-productive step while the metal cation salt in the second productive step.

23. A tyre component comprising the elastomeric compound according to claim 20.

24. The tyre component according to claim 23, wherein the tyre component is chosen from tread band, anti-abrasive strip, and sidewall.

25. A tyre for vehicle wheels comprising at least one tyre component according to claim 23.

26. The tyre composition according to claim 13, wherein the metal cation is selected from the group consisting of $Cu^{2+}$, $Fe^{2+}$, $Zn^{2+}$, $Mg^{2+}$, $Ca^{2+}$, $Ru^{3+}$, $Tb^{3+}$ and $Eu^{3+}$.

* * * * *